United States Patent
Kamada

(10) Patent No.: US 10,850,561 B2
(45) Date of Patent: Dec. 1, 2020

(54) BICYCLE WHEEL SECURING DEVICE

(71) Applicant: SHIMANO INC., Sakai (JP)

(72) Inventor: Kenji Kamada, Sakai (JP)

(73) Assignee: SHIMANO INC., Sakai (JP)

( * ) Notice: Subject to any disclaimer, the term of this patent is extended or adjusted under 35 U.S.C. 154(b) by 927 days.

(21) Appl. No.: 15/220,343

(22) Filed: Jul. 26, 2016

(65) Prior Publication Data

US 2018/0029411 A1    Feb. 1, 2018

(51) Int. Cl.
*B62K 25/02* (2006.01)
*B60B 27/02* (2006.01)

(52) U.S. Cl.
CPC ............ *B60B 27/026* (2013.01); *B62K 25/02* (2013.01); *B60B 2310/305* (2013.01); *B60B 2310/306* (2013.01); *B60B 2900/311* (2013.01); *B60B 2900/531* (2013.01); *B60B 2900/541* (2013.01); *B62K 2025/025* (2013.01); *B62K 2206/00* (2013.01)

(58) Field of Classification Search
CPC ...... B60B 27/026; B62K 25/02; B62K 25/04; B62K 25/005
See application file for complete search history.

(56) References Cited

U.S. PATENT DOCUMENTS

| | | | |
|---|---|---|---|
| 2,568,834 A | 9/1951 | Streifthau | |
| 5,549,315 A | 8/1996 | Ashman | |
| 6,089,675 A | 7/2000 | Schlanger | |
| 6,435,622 B1 | 8/2002 | Kanehisa et al. | |
| 7,278,693 B2 | 10/2007 | Smith et al. | |
| 7,648,211 B2 | 1/2010 | Watarai | |
| 8,042,881 B2 * | 10/2011 | Inoue | B62K 23/06 280/279 |
| 2008/0185907 A1* | 8/2008 | Hara | B60B 35/004 301/111.03 |
| 2008/0185908 A1 | 8/2008 | Hara | |
| 2008/0191545 A1* | 8/2008 | Laird | B62K 25/02 301/124.1 |
| 2008/0211296 A1 | 9/2008 | Takachi | |

(Continued)

FOREIGN PATENT DOCUMENTS

| | | |
|---|---|---|
| CN | 101234654 B | 10/2012 |
| FR | 1018113 | 12/1952 |
| WO | WO 2005/120940 | 12/2005 |

*Primary Examiner* — Scott A Browne
(74) *Attorney, Agent, or Firm* — Mori & Ward, LLP

(57) ABSTRACT

A bicycle wheel securing device comprises a shaft, an axial abutment structure, a bicycle-body engaging structure, a manual actuator, and a shaft-end retaining structure. The shaft has a first shaft end, a second shaft end, and a longitudinal center axis. The manual actuator is operatively connected to the axial abutment structure to bias the axial abutment structure against a first wheel attachment part of a bicycle body in response to operation of the manual actuator in a securing state where the bicycle-body engaging structure is engaged with a second wheel attachment part of the bicycle body. The shaft-end retaining structure is at least partly disposed at the second shaft end to retain the second shaft end in the first wheel attachment part in a maintenance state where the second shaft end is positioned in the first wheel attachment part of the bicycle body.

23 Claims, 29 Drawing Sheets

(56) References Cited

U.S. PATENT DOCUMENTS

| | | | |
|---|---|---|---|
| 2009/0315295 A1* | 12/2009 | Laird | B62K 25/02 280/279 |
| 2014/0225424 A1* | 8/2014 | Gerhardt | F16D 41/28 301/110.5 |
| 2014/0306512 A1* | 10/2014 | Nakajima | B62K 25/04 301/132 |

* cited by examiner

BICYCLE WHEEL SECURING DEVICE

BACKGROUND OF THE INVENTION

Field of the Invention

The present invention relates to a bicycle wheel securing device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a wheel securing device.

SUMMARY OF THE INVENTION

In accordance with a first aspect of the present invention, a bicycle wheel securing device comprises a shaft, an axial abutment structure, a bicycle-body engaging structure, a manual actuator, and a shaft-end retaining structure. The shaft has a first shaft end, a second shaft end, and a longitudinal center axis. The shaft extends between the first shaft end and the second shaft end along the longitudinal center axis. The axial abutment structure is disposed at the first shaft end. The bicycle-body engaging structure is disposed at the second shaft end. The manual actuator is operatively connected to the axial abutment structure to bias the axial abutment structure against a first wheel attachment part of a bicycle body in response to operation of the manual actuator in a securing state where the bicycle-body engaging structure is engaged with a second wheel attachment part of the bicycle body. The shaft-end retaining structure is at least partly disposed at the second shaft end to retain the second shaft end in the first wheel attachment part in a maintenance state where the second shaft end is positioned in the first wheel attachment part of the bicycle body.

With the bicycle wheel securing device according to the first aspect, the shaft can be retained by the shaft-end retaining structure with respect to the first wheel attachment part when a bicycle wheel is detached from and attached to the bicycle body. Accordingly, it is possible to smoothly detach and attach the bicycle wheel from and to the bicycle body.

In accordance with a second aspect of the present invention, the bicycle wheel securing device according to the first aspect is configured so that the shaft-end retaining structure includes an elastic retaining member.

With the bicycle wheel securing device according to the second aspect, it is possible to retain the second shaft end in the first wheel attachment part by using an elastic force of the elastic retaining member. Thus, it is possible to easily move the shaft along the longitudinal center axis relative to the bicycle body.

In accordance with a third aspect of the present invention, the bicycle wheel securing device according to any one of the above aspects is configured so that the elastic retaining member comprises a snap ring.

With the bicycle wheel securing device according to the third aspect, it is possible to retain the second shaft end in the first wheel attachment part by using an elastic force of the snap ring. Thus, it is possible to easily move the shaft along the longitudinal center axis relative to the bicycle body.

In accordance with a fourth aspect of the present invention, the bicycle wheel securing device according to any one of the above aspects is configured so that the shaft-end retaining structure includes a recess provided on the second shaft end to receive the elastic retaining member in a state where the shaft-end retaining structure retains the second shaft end in the first wheel attachment part.

With the bicycle wheel securing device according to the fourth aspect, the shaft can be certainly retained with respect to the first wheel attachment part by using engagement between the elastic retaining member and the recess.

In accordance with a fifth aspect of the present invention, the bicycle wheel securing device according to any one of the above aspects is configured so that the recess extends in a circumferential direction defined about the longitudinal center axis.

With the bicycle wheel securing device according to the fifth aspect, it is possible to smoothly bring the elastic retaining member into engagement with the recess since the recess extends in the circumferential direction.

In accordance with a sixth aspect of the present invention, the bicycle wheel securing device according to any one of the above aspects is configured so that the shaft-end retaining structure includes a projection and a recess. The projection is attached to one of the first wheel attachment part and the second shaft end. The recess is provided on the other of the first wheel attachment part and the second shaft end to receive the projection in a state where the shaft-end retaining structure retains the second shaft end in the first wheel attachment part.

With the bicycle wheel securing device according to the sixth aspect, the shaft can be certainly retained with respect to the first wheel attachment part by using engagement between the projection and the recess.

In accordance with a seventh aspect of the present invention, the bicycle wheel securing device according to any one of the above aspects is configured so that the projection includes a plunger.

With the bicycle wheel securing device according to the seventh aspect, it is possible to easily move the shaft along the longitudinal center axis relative to the bicycle body since the plunger is movable relative to the one of the first wheel attachment part and the second shaft end.

In accordance with an eighth aspect of the present invention, the bicycle wheel securing device according to any one of the above aspects is configured so that the recess extends in a circumferential direction defined about the longitudinal center axis.

With the bicycle wheel securing device according to the eighth aspect, it is possible to smoothly bring the projection into engagement with the recess since the recess extends in the circumferential direction.

In accordance with a ninth aspect of the present invention, the bicycle wheel securing device according to any one of the above aspects is configured so that the recess extends in an axial direction parallel to the longitudinal center axis and has a closed end in the second shaft end.

With the bicycle wheel securing device according to the ninth aspect, it is possible to move the shaft along the longitudinal center axis relative to the bicycle body in a state where the projection is engaged with the recess since the recess extends in the axial direction.

In accordance with a tenth aspect of the present invention, the bicycle wheel securing device according to any one of the above aspects is configured so that the projection includes a set screw attached to the first wheel attachment part. The recess is provided on the shaft to extend in an axial direction parallel to the longitudinal center axis and has a closed end in the second shaft end.

With the bicycle wheel securing device according to the tenth aspect, it is possible to move the set screw by using a tool since the projection includes the set screw. Furthermore, it is possible to move the shaft along the longitudinal center axis relative to the bicycle body in a state where the projection is engaged with the recess since the recess extends in the axial direction.

In accordance with an eleventh aspect of the present invention, the bicycle wheel securing device according to any one of the above aspects is configured so that the shaft-end retaining structure includes a magnet and a magnetic substance. The magnet is attached to one of the first wheel attachment part and the second shaft end. The magnetic substance is attached to the other of the first wheel attachment part and the second shaft end.

With the bicycle wheel securing device according to the eleventh aspect, the shaft can be retained with respect to the first wheel attachment part by using a magnetic force generated between the magnet and the magnetic substance. Thus, it is possible to easily move the shaft along the longitudinal center axis and to effectively retain the shaft with respect to the first wheel attachment part.

In accordance with a twelfth aspect of the present invention, the bicycle wheel securing device according to any one of the above aspects is configured so that the magnet is attached to the second shaft end. The magnetic substance is attached to the first wheel attachment part.

With the bicycle wheel securing device according to the twelfth aspect, the shaft can be retained with respect to the first wheel attachment part by using a magnetic force generated between the magnet and the magnetic substance. Thus, it is possible to easily move the shaft along the longitudinal center axis and to effectively retain the shaft with respect to the first wheel attachment part.

In accordance with a thirteenth aspect of the present invention, the bicycle wheel securing device according to any one of the above aspects is configured so that the magnetic substance has an annular shape.

With the bicycle wheel securing device according to the thirteenth aspect, it is possible to easily retain the second shaft end in the first wheel attachment part.

In accordance with a fourteenth aspect of the present invention, the bicycle wheel securing device according to any one of the above aspects is configured so that the manual actuator includes a lever pivotally mounted to the first shaft end. The manual actuator is operatively connected to the axial abutment structure to bias the axial abutment structure against the first wheel attachment part in response to a pivotal movement of the lever.

With the bicycle wheel securing device according to the fourteenth aspect, it is possible to easily secure the bicycle wheel to the bicycle body by the pivotal movement of the lever.

In accordance with a fifteenth aspect of the present invention, the bicycle wheel securing device according to any one of the above aspects is configured so that the shaft-end retaining structure includes the bicycle-body engaging structure.

With the bicycle wheel securing device according to the fifteenth aspect, it is possible to simplify the structure of the bicycle wheel securing device since the bicycle-body engaging structure is utilized as the shaft-end retaining structure.

In accordance with a sixteenth aspect of the present invention, the bicycle wheel securing device according to any one of the above aspects is configured so that the bicycle-body engaging structure includes a threaded portion provided on the second shaft end.

With the bicycle wheel securing device according to the sixteenth aspect, it is possible to reliably secure the shaft to the second wheel attachment part.

In accordance with a seventeenth aspect of the present invention, the bicycle wheel securing device according to any one of the above aspects is configured so that the threaded portion includes a male thread configured to be screwed in a female thread provided on the second wheel attachment part.

With the bicycle wheel securing device according to the seventeenth aspect, it is possible to secure the shaft to the second wheel attachment part via the male thread and the female thread.

In accordance with an eighteenth aspect of the present invention, the bicycle wheel securing device according to any one of the above aspects is configured so that the shaft-end retaining structure includes the male thread.

With the bicycle wheel securing device according to the eighteenth aspect, it is possible to simplify the structure of the bicycle wheel securing device since the male thread is utilized as the shaft-end retaining structure.

In accordance with a nineteenth aspect of the present invention, the bicycle wheel securing device according to any one of the above aspects is configured so that the shaft-end retaining structure is configured to limit displacement of the shaft in an axial direction parallel to the longitudinal center axis in the maintenance state where the second shaft end is positioned in the first wheel attachment part of the bicycle body.

With the bicycle wheel securing device according to the nineteenth aspect, the shaft can be certainly retained by the shaft-end retaining structure with respect to the first wheel attachment part when the bicycle wheel is detached from and attached to the bicycle body. Accordingly, it is possible to more smoothly detach and attach the bicycle wheel from and to the bicycle body.

In accordance with a twentieth aspect of the present invention, the bicycle wheel securing device according to any one of the above aspects is configured so that an axial distance defined between the shaft-end retaining structure and a shaft tip of the second shaft end in an axial direction parallel to the longitudinal center axis ranges from 5.0 mm to 35.0 mm.

With the bicycle wheel securing device according to the twentieth aspect, it is possible to reduce a protrusion amount of the second shaft end from the first wheel attachment part in the maintenance state where the second shaft end is positioned in the first wheel attachment part of the bicycle body. Thus, it is possible to smoothly detach and attach the bicycle wheel from and to the bicycle body. Especially, this is effective in a case where the bicycle wheel securing device is applied to a mountain bike.

In accordance with a twenty-first aspect of the present invention, the bicycle wheel securing device according to any one of the above aspects is configured so that the axial distance is equal to or smaller than 20.0 mm.

With the bicycle wheel securing device according to the twenty-first aspect, it is possible to further reduce the protrusion amount of the second shaft end from the first wheel attachment part in the maintenance state where the second shaft end is positioned in the first wheel attachment part of the bicycle body. Thus, it is possible to more smoothly detach and attach the bicycle wheel from and to the bicycle body. Especially, this is effective in a case where the bicycle wheel securing device is applied to a road bike.

In accordance with a twenty-second aspect of the present invention, a bicycle wheel securing device comprises a shaft, an axial abutment structure, a bicycle-body engaging structure, a manual actuator, and a shaft-end retaining structure. The shaft has a first shaft end, a second shaft end, and a longitudinal center axis. The shaft extends between the first shaft end and the second shaft end along the longitudinal center axis. The axial abutment structure is disposed at the first shaft end. The bicycle-body engaging structure is disposed at the second shaft end. The manual actuator is operatively connected to the axial abutment structure to bias the axial abutment structure against a first wheel attachment part of a bicycle body in response to operation of the manual actuator in a state where the bicycle-body engaging structure is engaged with a second wheel attachment part of the bicycle body. The shaft-end retaining structure comprises a first retaining structure and a second retaining structure. The first retaining structure is disposed at the first wheel attachment part. The second retaining structure is at least partly disposed at the second shaft end to be retained with the first retaining structure in a state where the second shaft end is positioned in the first wheel attachment part.

With the bicycle wheel securing device according to the twenty-second aspect, the shaft can be retained by the shaft-end retaining structure with respect to the first wheel attachment part when a bicycle wheel is detached from and attached to the bicycle body. Accordingly, it is possible to smoothly detach and attach the bicycle wheel from and to the bicycle body.

In accordance with a twenty-third aspect of the present invention, the bicycle wheel securing device according to any one of the above aspects is configured so that the shaft-end retaining structure is configured to limit displacement of the shaft in an axial direction parallel to the longitudinal center axis in a state where the second shaft end is positioned in the first wheel attachment part.

With the bicycle wheel securing device according to the twenty-third aspect, the shaft can be certainly retained by the shaft-end retaining structure with respect to the first wheel attachment part when a bicycle wheel is detached from and attached to the bicycle body. Accordingly, it is possible to more smoothly detach and attach the bicycle wheel from and to the bicycle body.

In accordance with a twenty-fourth aspect of the present invention, the bicycle wheel securing device according to any one of the above aspects is configured so that an axial distance defined between the second retaining structure of the shaft-end retaining structure and a shaft tip of the second shaft end in an axial direction parallel to the longitudinal center axis ranges from 5.0 mm to 35.0 mm.

With the bicycle wheel securing device according to the twenty-fourth aspect, it is possible to reduce a protrusion amount of the second shaft end from the first wheel attachment part in the maintenance state where the second shaft end is positioned in the first wheel attachment part of the bicycle body. Thus, it is possible to smoothly detach and attach the bicycle wheel from and to the bicycle body. Especially, this is effective in a case where the bicycle wheel securing device is applied to a mountain bike.

In accordance with a twenty-fifth aspect of the present invention, the bicycle wheel securing device according to any one of the above aspects is configured so that the axial distance is equal to or smaller than 20.0 mm.

With the bicycle wheel securing device according to the twenty-fifth aspect, it is possible to further reduce the protrusion amount of the second shaft end from the first wheel attachment part in the maintenance state where the second shaft end is positioned in the first wheel attachment part of the bicycle body. Thus, it is possible to more smoothly detach and attach the bicycle wheel from and to the bicycle body. Especially, this is effective in a case where the bicycle wheel securing device is applied to a road bike.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
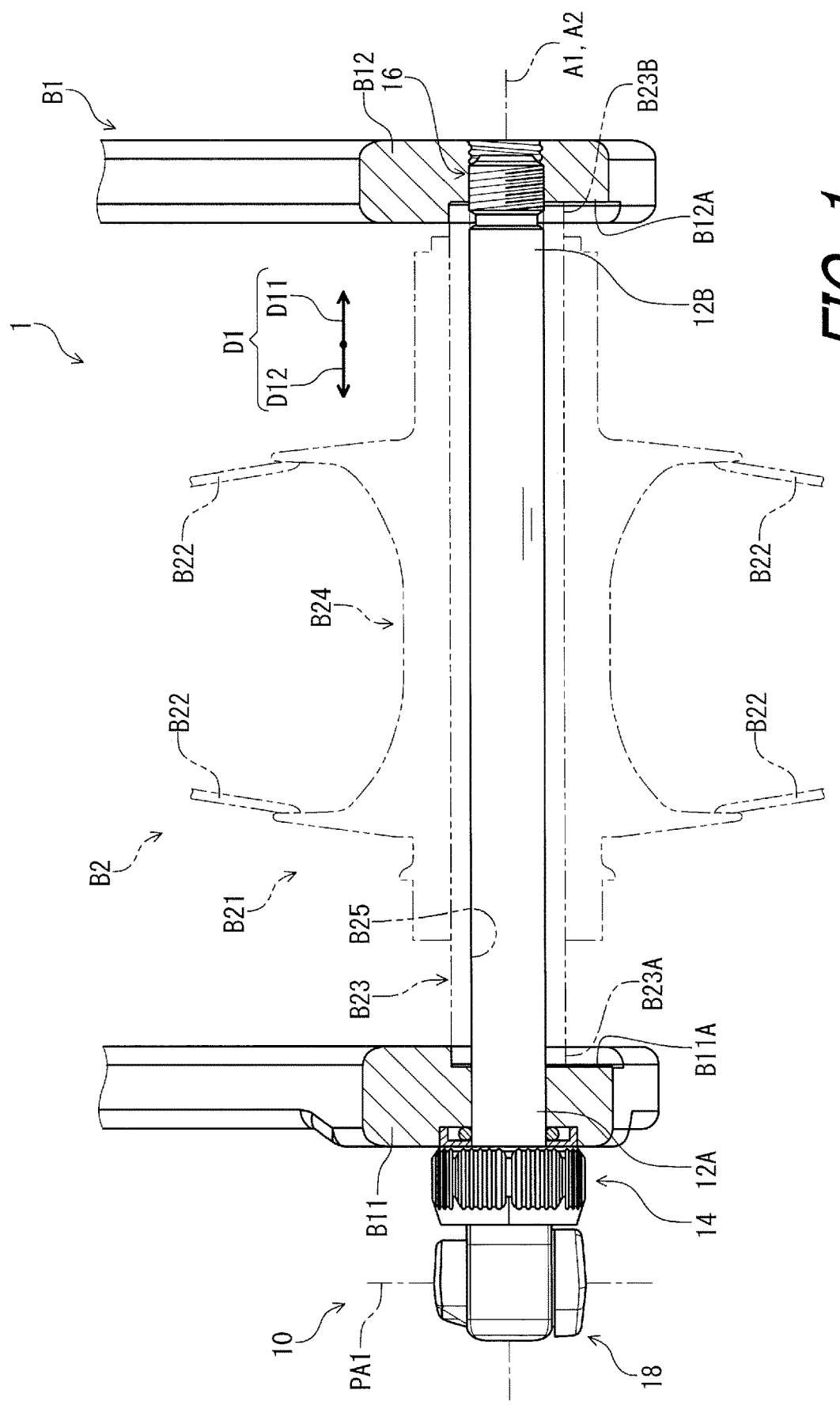
FIG. 1 is a partial cross-sectional view of a bicycle including a bicycle body and a bicycle wheel securing device in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle 1 including a bicycle wheel securing device 10 in accordance with a first embodiment is illustrated. The bicycle 1 further includes a bicycle body B1 and a bicycle wheel B2. The bicycle wheel B2 is detachably secured to the bicycle body B1 with the bicycle wheel securing device 10. The bicycle body B1 includes a bicycle frame, a front fork (not shown), a stem (not shown), and a handlebar (not shown), for example. The front fork is rotatably coupled to the bicycle frame. The handlebar is secured to the front fork with the stem. In this embodiment, the bicycle wheel B2 is a rear wheel. However, the bicycle wheel B2 can be another wheel such as a front wheel. Namely, structures of the bicycle wheel securing device 10 can be applied to a wheel securing device to secure the front wheel to the front fork (not shown). Since other components of the bicycle 1 have been known in the bicycle field, they will not be described in detail here for the sake of brevity.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of the bicycle 1 with facing the handlebar (not shown). Accordingly, these terms, as utilized to describe the bicycle wheel securing device 10, should be interpreted relative to the bicycle 1 equipped with the bicycle wheel securing device 10 as used in an upright riding position on a horizontal surface.

As seen in FIG. 1, the bicycle wheel B2 includes a hub assembly B21, spokes B22, and a rim (not shown). The hub assembly B21 includes a hub axle B23 and a hub shell B24. The hub shell B24 is rotatably mounted on the hub axle B23 about a rotational axis A1. The hub shell B24 is coupled to the rim (not shown) via the spokes B22. The bicycle wheel securing device 10 extends through a hub through-hole B25 of the hub axle B23 in a state where the bicycle wheel B2 is secured to the bicycle body B1 with the bicycle wheel securing device 10.

The bicycle body B1 includes a first wheel attachment part B11 and a second wheel attachment part B12. The second wheel attachment part B12 is spaced apart from the first wheel attachment part B11. The bicycle wheel B2 is detachably secured to the first wheel attachment part B11 and the second wheel attachment part B12 with the bicycle wheel securing device 10. The term "detachably secured" or "detachably securing", as used herein, encompasses configurations in which an element directly secured to another element by directly affixing the element to the other element while the element is detachable from the other element without substantial damage; and configurations in which the element is indirectly secured to the other element via intermediate member(s) while the element is detachable from the other element and the intermediate member(s) without substantial damage. This concept also applies to words of similar meaning, for example, "detachably attached", "detachably joined", "detachably connected", "detachably coupled", "detachably mounted", "detachably bonded", "detachably fixed" and their derivatives.

Figure 2:
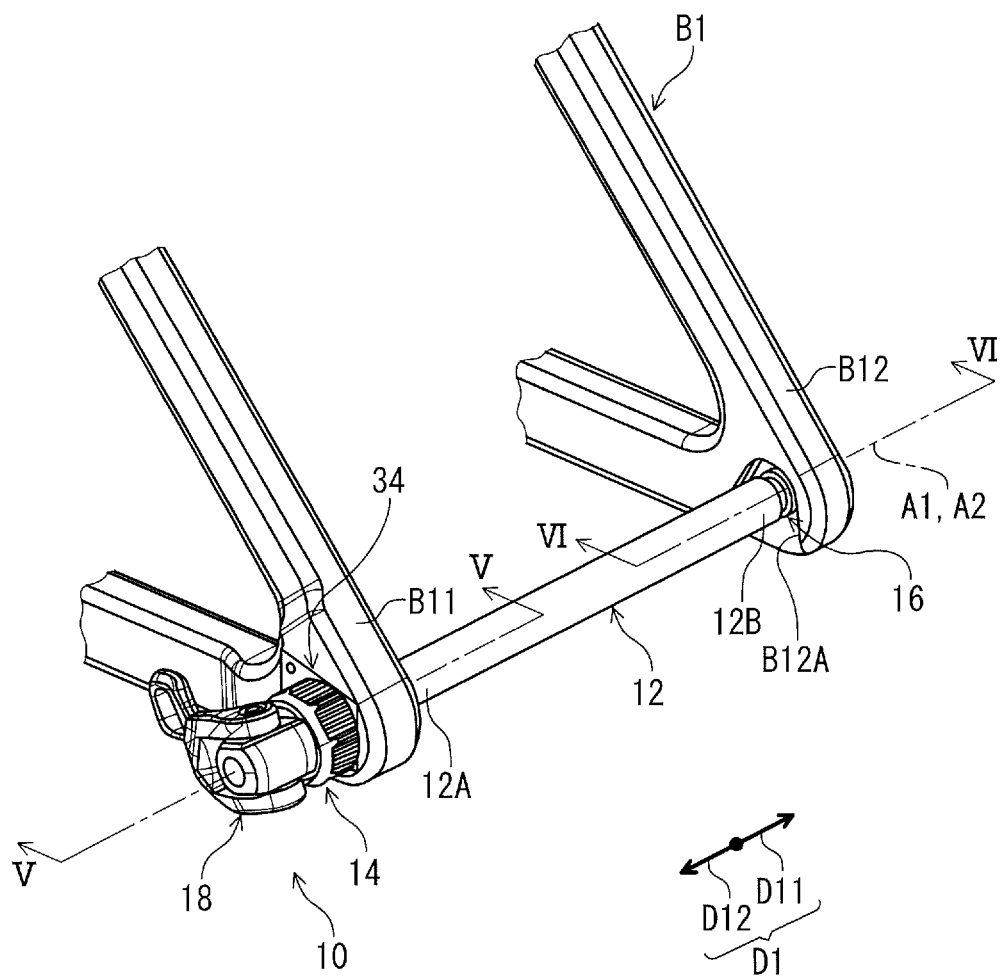
FIG. 2 is a perspective view of the bicycle body and the bicycle wheel securing device illustrated in FIG. 1 (securing state).
Figure 3:
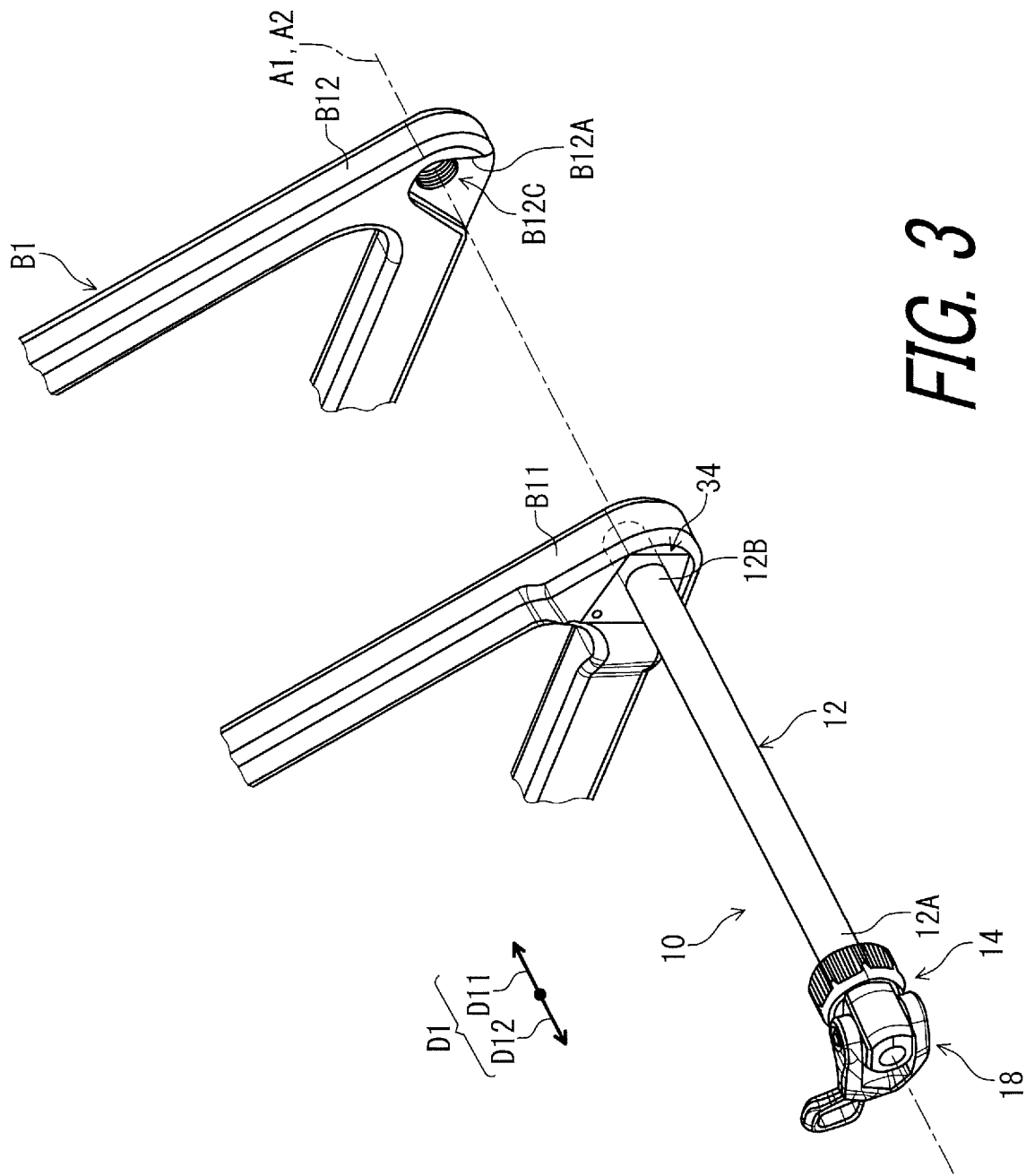
FIG. 3 is a perspective view of the bicycle body and the bicycle wheel securing device illustrated in FIG. 1 (maintenance state).

As seen in FIGS. 2 and 3, the bicycle wheel securing device 10 has a securing state and a maintenance state. FIG. 2 illustrates the bicycle wheel securing device 10 and the bicycle body B1 in the securing state where the bicycle wheel B2 (FIG. 1) is secured to the bicycle body B1 with the bicycle wheel securing device 10. FIG. 3 illustrates the bicycle wheel securing device 10 and the bicycle body B1 in the maintenance state where the bicycle wheel B2 is detachable from and/or attachable to the bicycle body B1. The term "detachable and/or attachable", as used herein, encompasses a configuration in which an element is repeatedly detachable from and attachable to another element without substantial damage.

Figure 4:
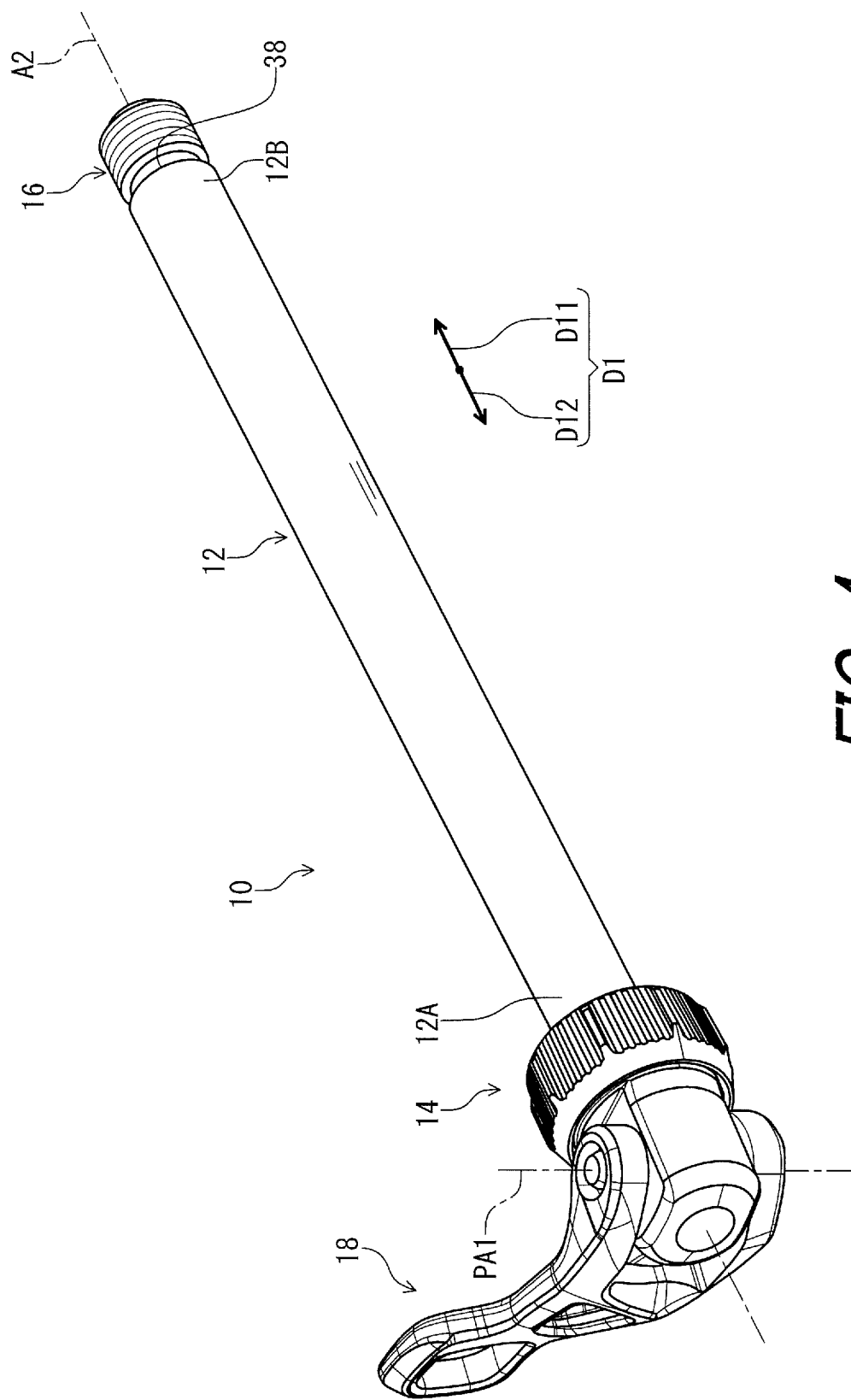
FIG. 4 is a perspective view of the bicycle wheel securing device illustrated in FIG. 1.

As seen in FIG. 4, the bicycle wheel securing device 10 comprises a shaft 12, an axial abutment structure 14, a bicycle-body engaging structure 16, and a manual actuator 18. The shaft 12 has a first shaft end 12A, a second shaft end 12B, and a longitudinal center axis A2. The shaft 12 extends between the first shaft end 12A and the second shaft end 12B along the longitudinal center axis A2. The axial abutment structure 14 is disposed at the first shaft end 12A. The bicycle-body engaging structure 16 is disposed at the second shaft end 12B. The manual actuator 18 is disposed at the first shaft end 12A.

As seen in FIG. 1, the manual actuator 18 is operatively connected to the axial abutment structure 14 to bias the axial abutment structure 14 against the first wheel attachment part B11 of the bicycle body B1 in response to operation of the manual actuator 18 in a securing state where the bicycle-body engaging structure 16 is engaged with the second wheel attachment part B12 of the bicycle body B1. Thus, the securing state also means a state where the bicycle-body engaging structure 16 is engaged with the second wheel attachment part B12 of the bicycle body B1. The manual actuator 18 is operated by the user when the bicycle wheel B2 is detached from and/or attached to the bicycle body B1.

The shaft 12 extends through the hub through-hole B25 of the hub axle B23 in a securing state where the bicycle wheel B2 is secured to the bicycle body B1 with the bicycle wheel securing device 10. The shaft 12 extends between the first wheel attachment part B11 and the second wheel attachment part B12 along the longitudinal center axis A2 in the securing state of the bicycle wheel securing device 10. The longitudinal center axis A2 of the shaft 12 substantially coincides with the rotational axis A1 in the securing state where the bicycle wheel B2 is secured to the bicycle body B1 with the bicycle wheel securing device 10. A first axle end B23A of the hub axle B23 is provided in a first attachment recess B11A of the first wheel attachment part B11. A second axle end B23B of the hub axle B23 is provided in a second attachment recess B12A of the second wheel attachment part B12.

Figure 5:
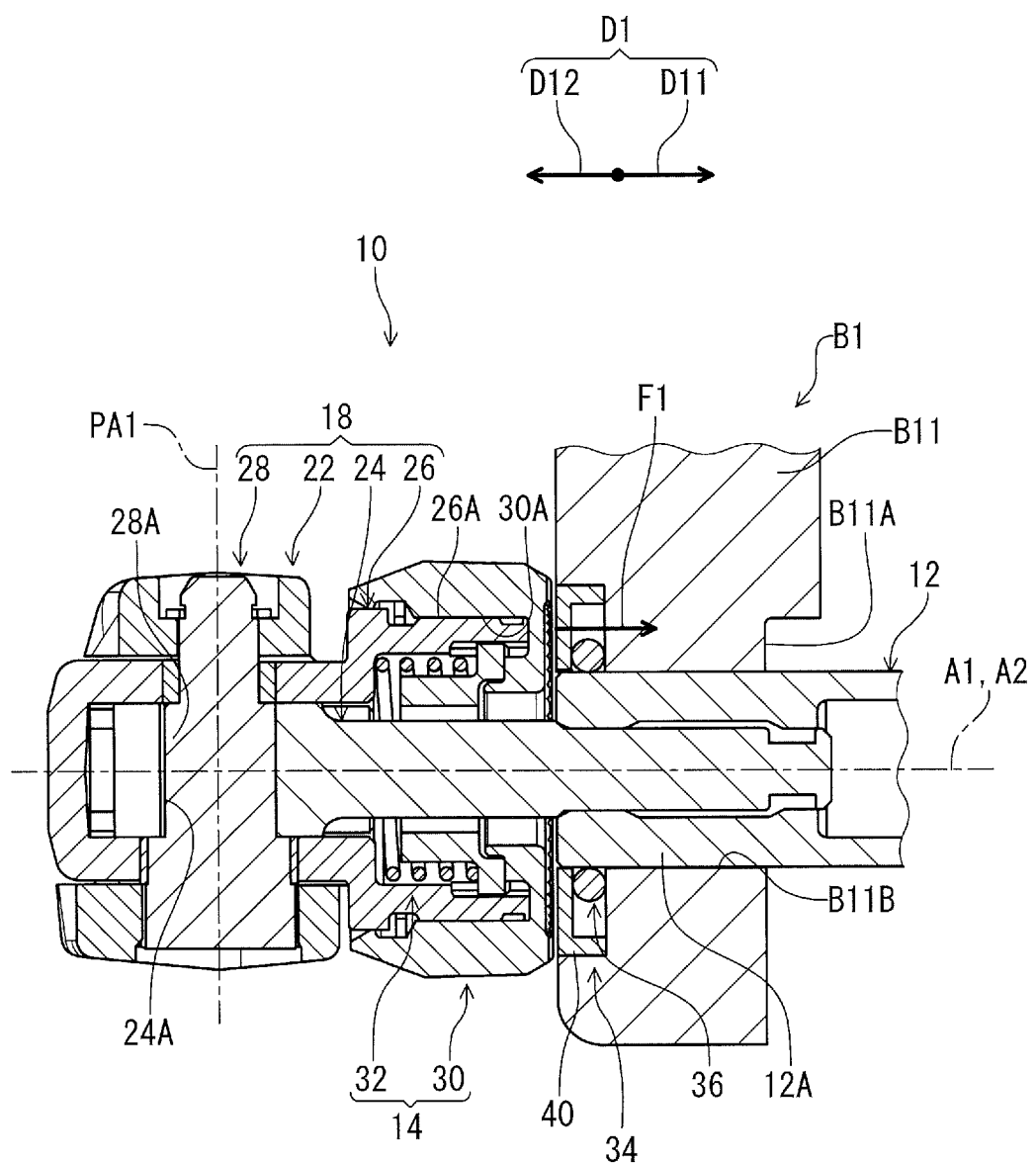
FIG. 5 is a cross-sectional view of the bicycle wheel securing device taken along line V-V of FIG. 2.

As seen in FIG. 5, the first wheel attachment part B11 includes a first hole B11B. The shaft 12 extends through the first hole B11B. The first shaft end 12A is provided in the first wheel attachment part B11 in the securing state of the bicycle wheel securing device 10.

Figure 6:
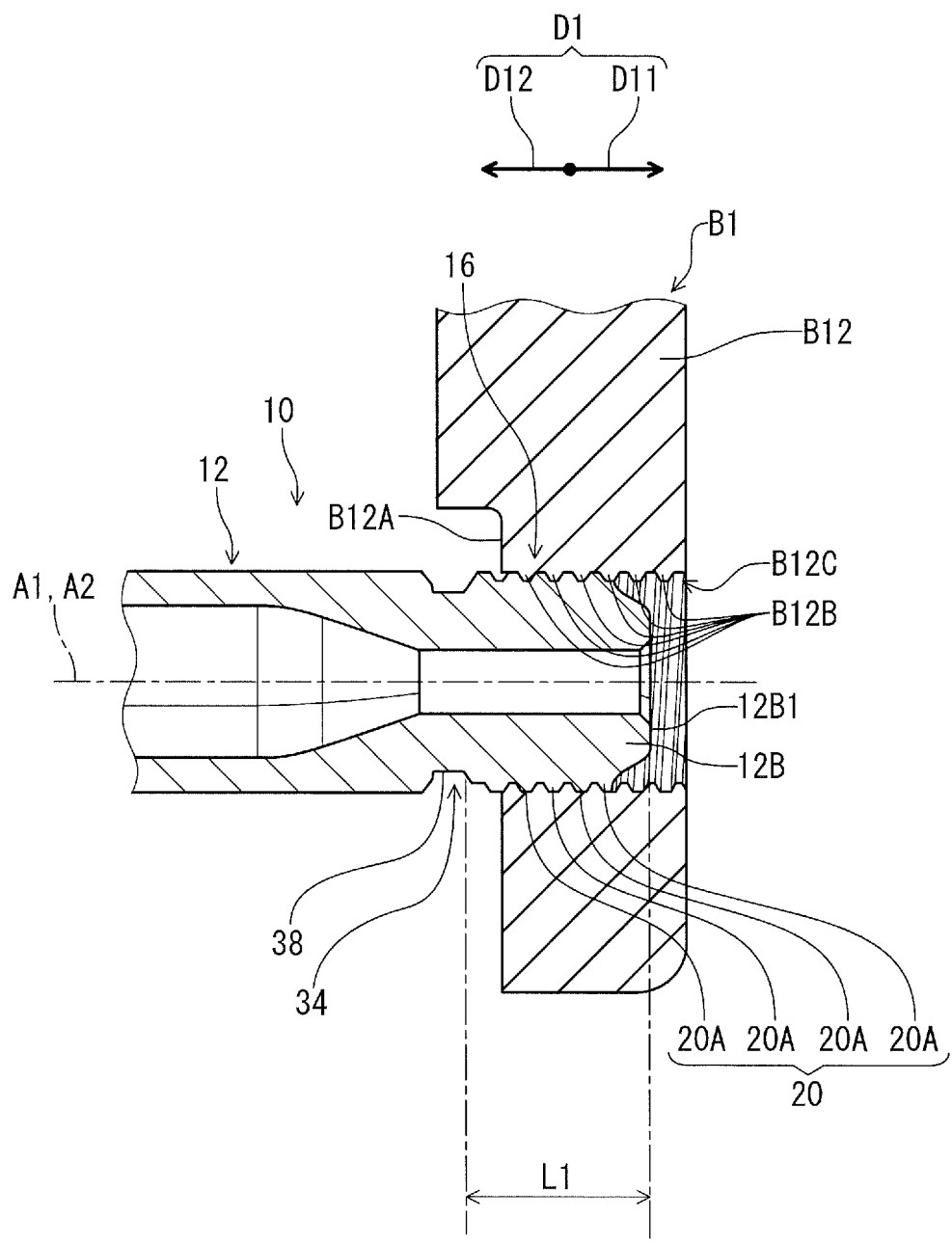
FIG. 6 is a cross-sectional view of the bicycle wheel securing device taken along line VI-VI of FIG. 2.

As seen in FIG. 6, the bicycle-body engaging structure 16 includes a threaded portion 20 provided on the second shaft end 12B. The threaded portion 20 includes a male thread 20A configured to be screwed in a female thread B12B provided on the second wheel attachment part B12. In this embodiment, the threaded portion 20 includes a plurality of male threads 20A. The second wheel attachment part B12 includes a plurality of female threads B12B. The plurality of male threads 20A are configured to be screwed in the plurality of female threads B12B. The second wheel attachment part B12 includes a second hole B12C. The plurality of female threads B12B are provided on an inner periphery of the second hole B12C. However, the threaded portion 20 can include at least one male thread 20A, and the second wheel attachment part B12 can include at least one female thread B12B. Furthermore, the bicycle-body engaging structure 16 can have a shape other than the threaded portion 20. The bicycle-body engaging structure 16 is integrally provided with the second shaft end 12B as a one-piece unitary member. However, the bicycle-body engaging structure 16 can be a separate member from the second shaft end 12B.

Figure 7:
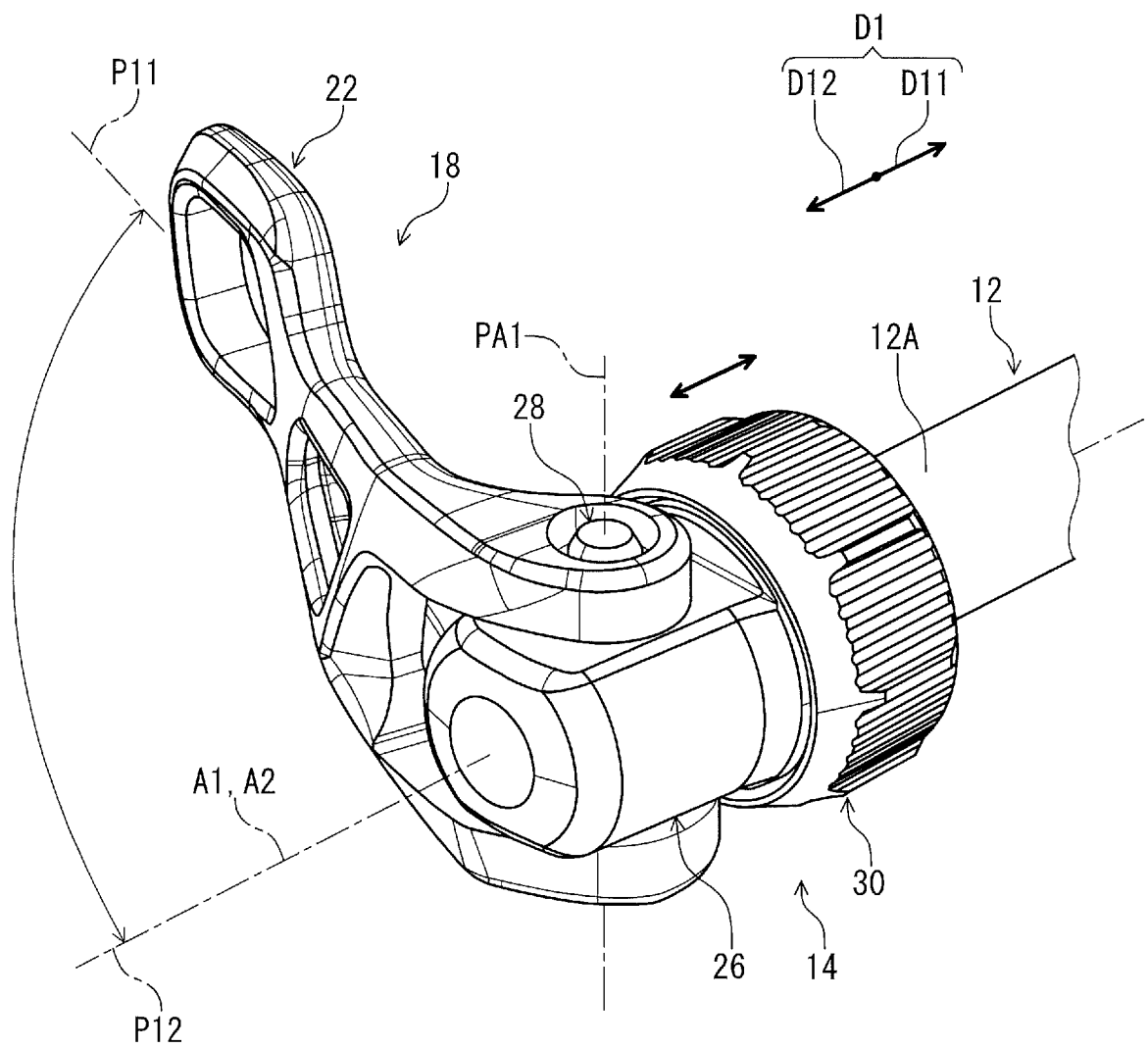
FIG. 7 is a partial perspective view of the bicycle wheel securing device illustrated in FIG. 1.

As seen in FIG. 7, the manual actuator 18 includes a lever 22 pivotally mounted to the first shaft end 12A. The manual actuator 18 is operatively connected to the axial abutment structure 14 to bias the axial abutment structure 14 against the first wheel attachment part B11 (FIG. 5) in response to a pivotal movement of the lever 22. The lever 22 is configured to apply and release a securing force F1 (FIG. 5) to and from the first wheel attachment part B11 in the securing state where the bicycle-body engaging structure 16 is engaged with the second wheel attachment part B12 of the bicycle body B1. The lever 22 is pivotable relative to the first shaft end 12A about a first pivot axis PA1 to apply and release the securing force F1 to and from the first wheel attachment part B11.

As seen in FIG. 5, the first pivot axis PA1 is non-parallel to the longitudinal center axis A2. In the illustrated embodiment, the first pivot axis PA1 is defined to intersect with the longitudinal center axis A2. Specifically, the first pivot axis PA1 is perpendicular to the longitudinal center axis A2. However, a positional relationship between the first pivot axis PA1 and the longitudinal center axis A2 is not limited to this embodiment.

Figure 8:
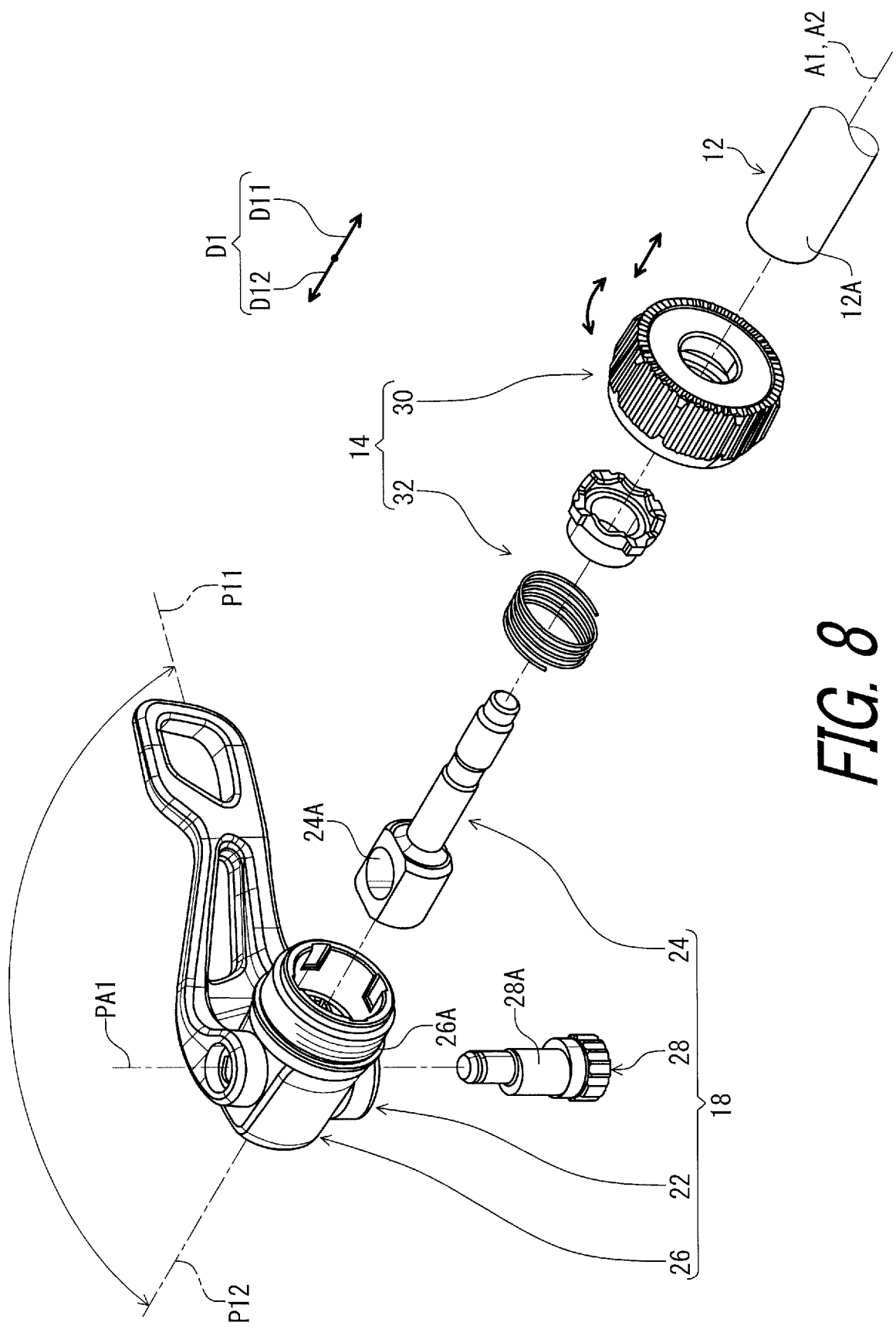
FIG. 8 is a partial exploded perspective view of the bicycle wheel securing device illustrated in FIG. 1.

As seen in FIG. 8, the manual actuator 18 further includes a coupling rod 24, a movable member 26, and a pivot pin 28. The coupling rod 24 is secured to the first shaft end 12A of the shaft 12. Accordingly, the manual actuator 18 is disposed at the first shaft end 12A of the shaft 12. The coupling rod 24 movably supports the movable member 26 relative to the shaft 12. The movable member 26 is movable relative to the shaft 12 in an axial direction D1 parallel to the longitudinal center axis A2. The lever 22 is pivotably coupled to the movable member 26 with the pivot pin 28. The pivot pin 28 is coupled to the lever 22 to pivot together with the lever 22 relative to the movable member 26 about the first pivot axis PA1.

The coupling rod 24 includes a cam hole 24A. The pivot pin 28 extends through the cam hole 24A. The pivot pin 28 includes a cam portion 28A. The cam portion 28A is provided in the cam hole 24A to provide a relative movement between the shaft 12 and the movable member 26 in the axial direction D1 in response to a pivotal movement of the lever 22. In this embodiment, the lever 22 is pivotable relative to the movable member 26 about the first pivot axis PA1 between a securing position P11 and a release position P12. The movable member 26 is moved relative to the shaft 12 in a first axial direction D11 in response to a pivotal movement of the lever 22 from the release position P12 to the securing position P11. The movable member 26 is moved relative to the shaft 12 in a second axial direction D12 in response to a pivotal movement of the lever 22 from the securing position P11 to the release position P12.

As seen in FIGS. 5 and 8, the axial abutment structure 14 includes an adjustment member 30 and a positioning structure 32. The adjustment member 30 is coupled to the movable member 26 to transmit the securing force F1 to the first wheel attachment part B11 of the bicycle body B1. In the illustrated embodiment, the adjustment member 30 has an adjustment threaded hole 30A. The movable member 26 has an externally threaded part 26A engaged with the adjustment threaded hole 30A. The externally threaded part 26A and the adjustment threaded hole 30A are configured to convert a rotation of the adjustment member 30 relative to the movable member 26 into an axial movement of the adjustment member 30 relative to the movable member 26 in the axial direction D1. The positioning structure 32 couples the adjustment member 30 to the movable member 26 to selectively position the adjustment member 30 relative to the movable member 26 at a plurality of rotational positions. The structure of each of the manual actuator 18 and the axial abutment structure 14 is not limited to this embodiment.

As seen in FIG. 6, the bicycle-body engaging structure 16 is screwed in the female threads B12B when a state of the bicycle wheel securing device 10 is changed from the maintenance state (FIG. 3) to the securing state (FIG. 2). As seen in FIG. 5, the adjustment member 30 is rotated relative to the movable member 26 to move toward the first wheel attachment part B11 in a state where the lever 22 is in the release position P12. The movable member 26 and the adjustment member 30 are moved toward the first wheel attachment part B11 in the first axial direction D11 when the lever 22 is pivoted relative to the movable member 26 from the release position P12 (FIG. 8) to the securing position P11 (FIG. 8). A final position of the lever 22 in the securing state can be adjusted by rotating the adjustment member 30 in a state where the lever 22 is in the release position P12. Thus, as seen in FIG. 1, the hub axle B23 and the first wheel attachment part B11 are held between the second wheel attachment part B12 and the axial abutment structure 14 in the axial direction D1.

Figure 9:
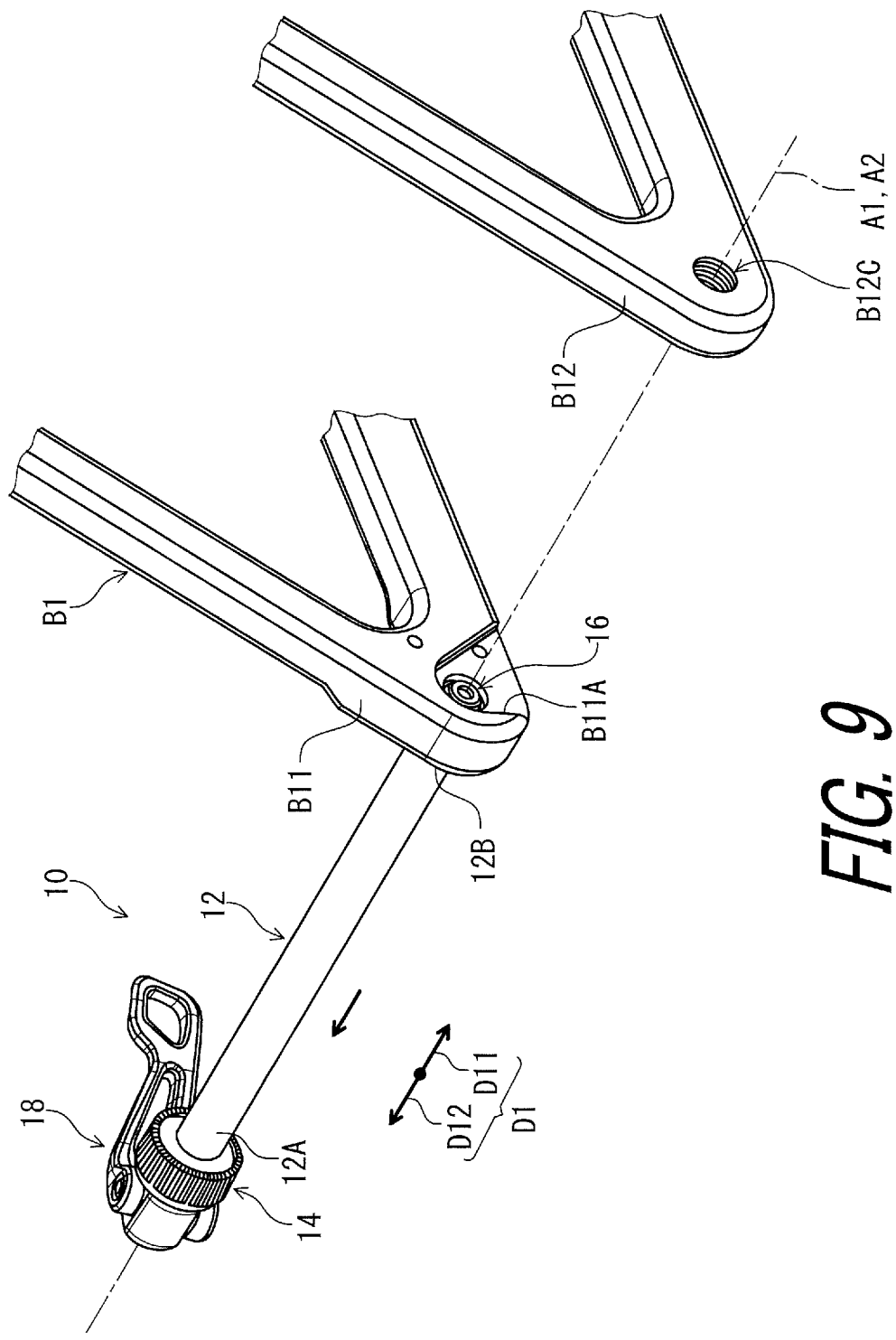
FIG. 9 is another perspective view of the bicycle body and the bicycle wheel securing device illustrated in FIG. 1 (maintenance state).

The reveres procedure is performed when the state of the bicycle wheel securing device 10 is changed from the securing state (FIG. 2) to the maintenance state (FIG. 3). As seen in FIG. 9, the second shaft end 12B is moved to the first wheel attachment part B11 after the bicycle-body engaging structure 16 is disengaged from the female threads B12B of the second wheel attachment part B12. The bicycle wheel securing device 10 has a structure to keep the maintenance state illustrated in FIG. 9.

Figure 10:
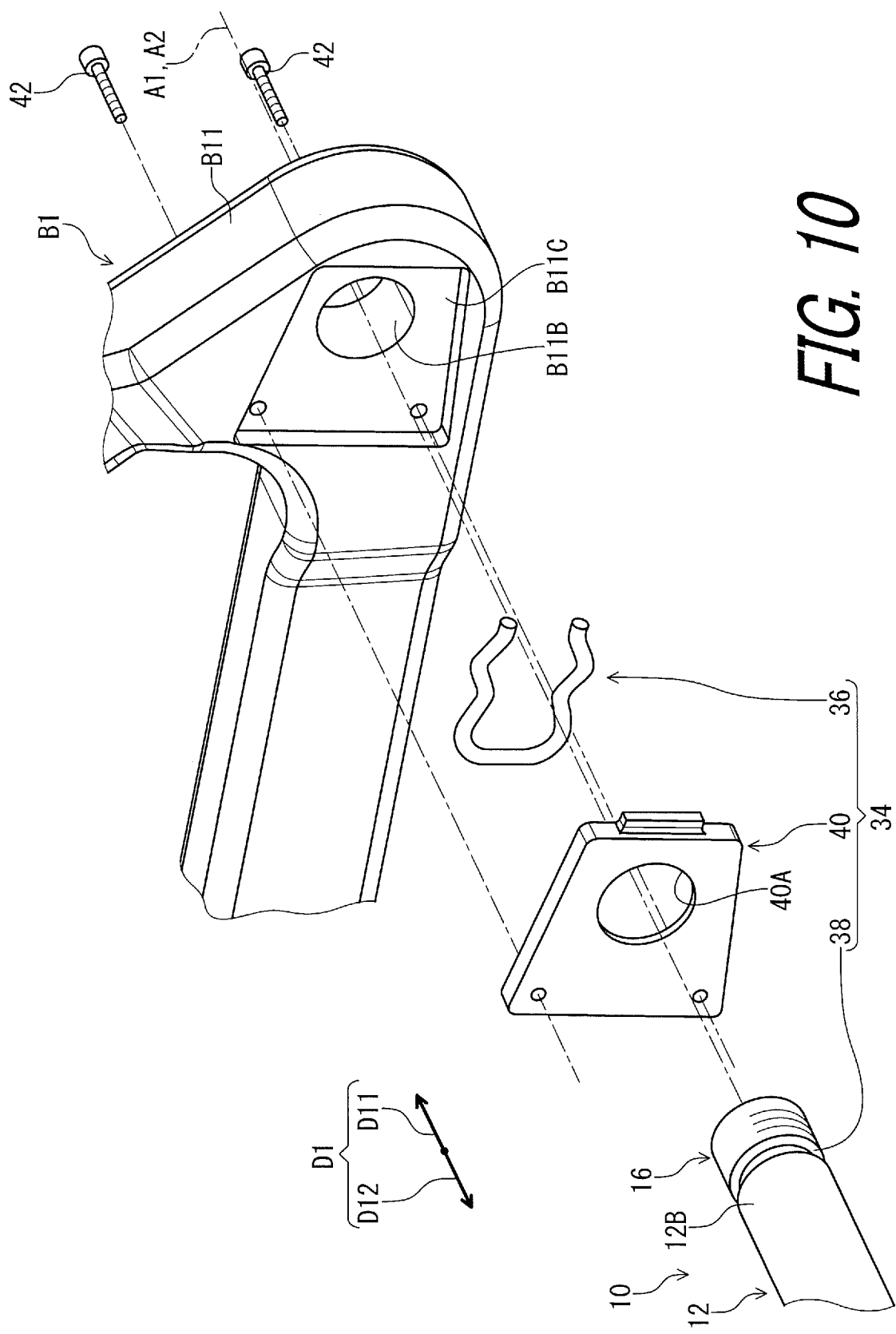
FIG. 10 is an exploded perspective view of a shaft-end retaining structure of the bicycle wheel securing device illustrated in FIG. 1.
Figure 11:
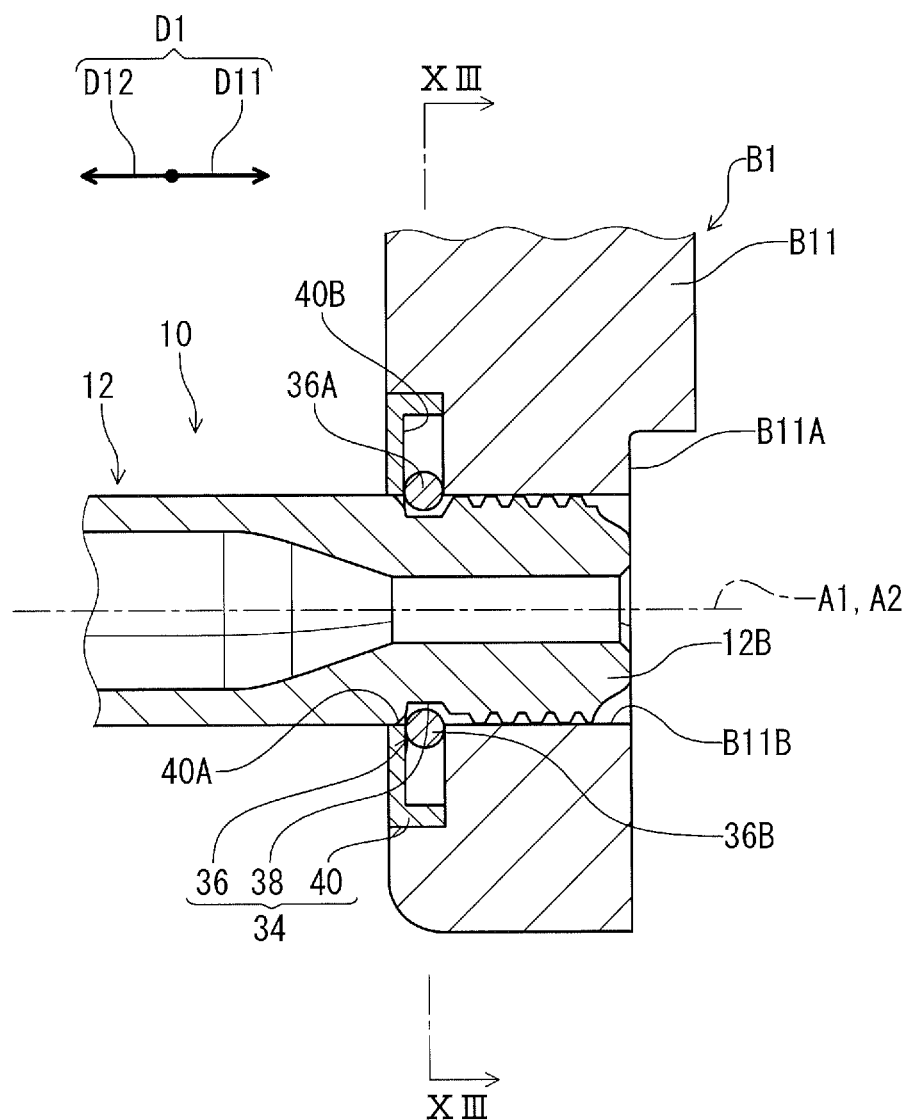
FIG. 11 is a cross-sectional view of the bicycle wheel securing device taken along line XI-XI of FIG. 13.

As seen in FIGS. 10 and 11, the bicycle wheel securing device 10 comprises a shaft-end retaining structure 34. The shaft-end retaining structure 34 is at least partly disposed at the second shaft end 12B to retain the second shaft end 12B in the first wheel attachment part B11 in a maintenance state where the second shaft end 12B is positioned in the first wheel attachment part B11 of the bicycle body B1. Thus, the maintenance state also means a state where the second shaft end 12B is positioned in the first wheel attachment part B11. The shaft-end retaining structure 34 is configured to limit displacement of the shaft 12 in the axial direction D1 parallel to the longitudinal center axis A2 in the maintenance state where the second shaft end 12B is positioned in the first wheel attachment part B11 of the bicycle body B1.

In this embodiment, the shaft-end retaining structure 34 includes an elastic retaining member 36. The elastic retaining member 36 comprises a snap ring. The shaft-end retaining structure 34 includes a recess 38 provided on the second shaft end 12B to receive the elastic retaining member 36 in a state where the shaft-end retaining structure 34 retains the second shaft end 12B in the first wheel attachment part B11. However, the elastic retaining member 36 is not limited to this embodiment.

In this embodiment, the elastic retaining member 36 can also be referred to as a first retaining structure 36, and the recess 38 can also be referred to as a second retaining structure 38. Namely, the shaft-end retaining structure 34 comprises the first retaining structure 36 and the second retaining structure 38. The first retaining structure 36 is disposed at the first wheel attachment part B11. The second retaining structure 38 is at least partly disposed at the second shaft end 12B to be engaged with the first retaining structure 36 in the maintenance state where the second shaft end 12B is positioned in the first wheel attachment part B11 of the bicycle body B1.

The shaft-end retaining structure 34 includes a cover 40 configured to be attached to the first wheel attachment part B11. The cover 40 is provided in a cover attachment recess B11C of the first wheel attachment part B11. The cover 40 is secured to the first wheel attachment part B11 with screws 42 (FIG. 10). The cover 40 includes an opening 40A. The shaft 12 extends through the opening 40A. The elastic retaining member 36 is provided between the first wheel attachment part B11 and the cover 40 to be restricted from moving relative to the first wheel attachment part B11 in the axial direction D1.

Figure 12:
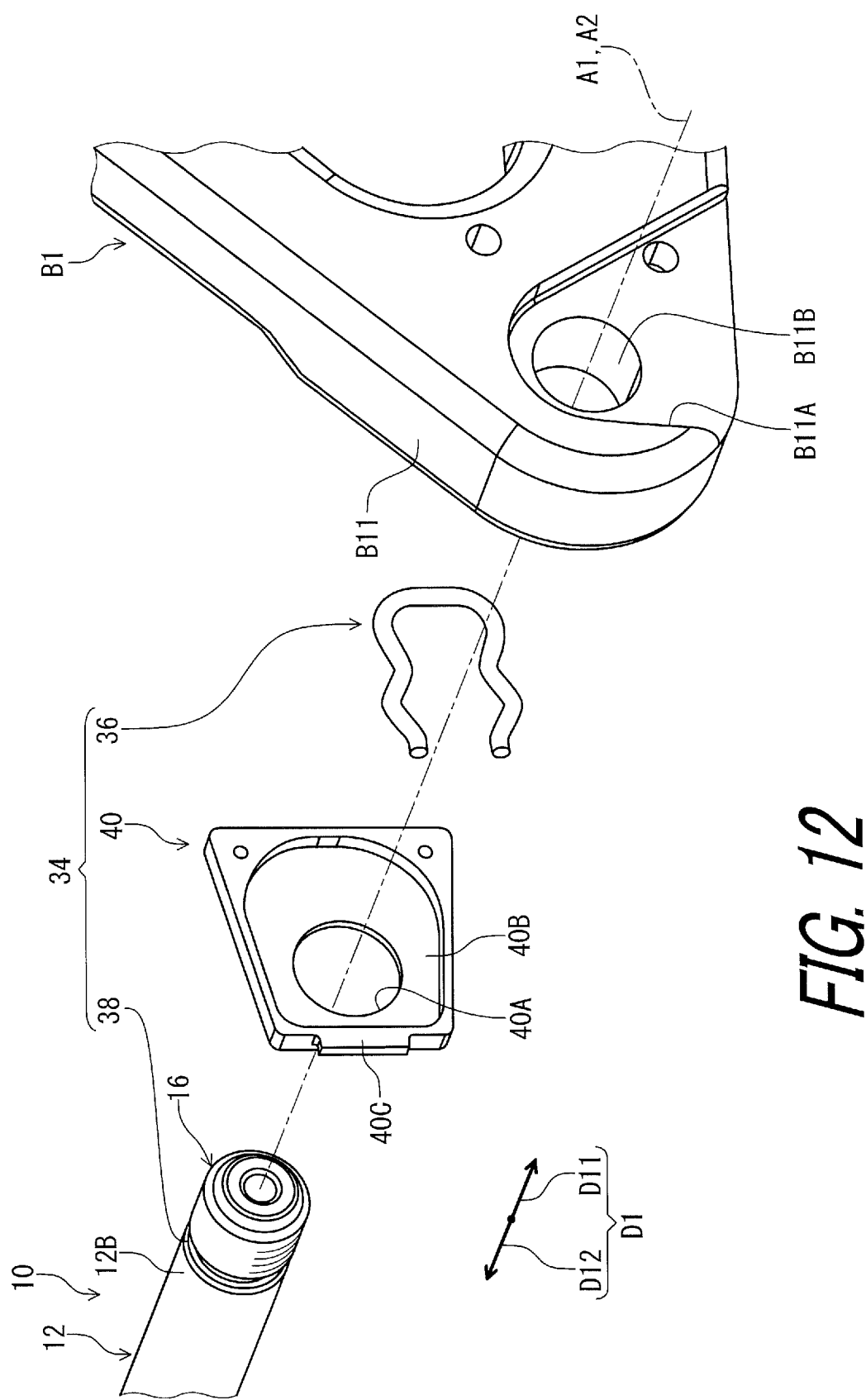
FIG. 12 is another exploded perspective view of a shaft-end retaining structure of the bicycle wheel securing device illustrated in FIG. 1.
Figure 13:
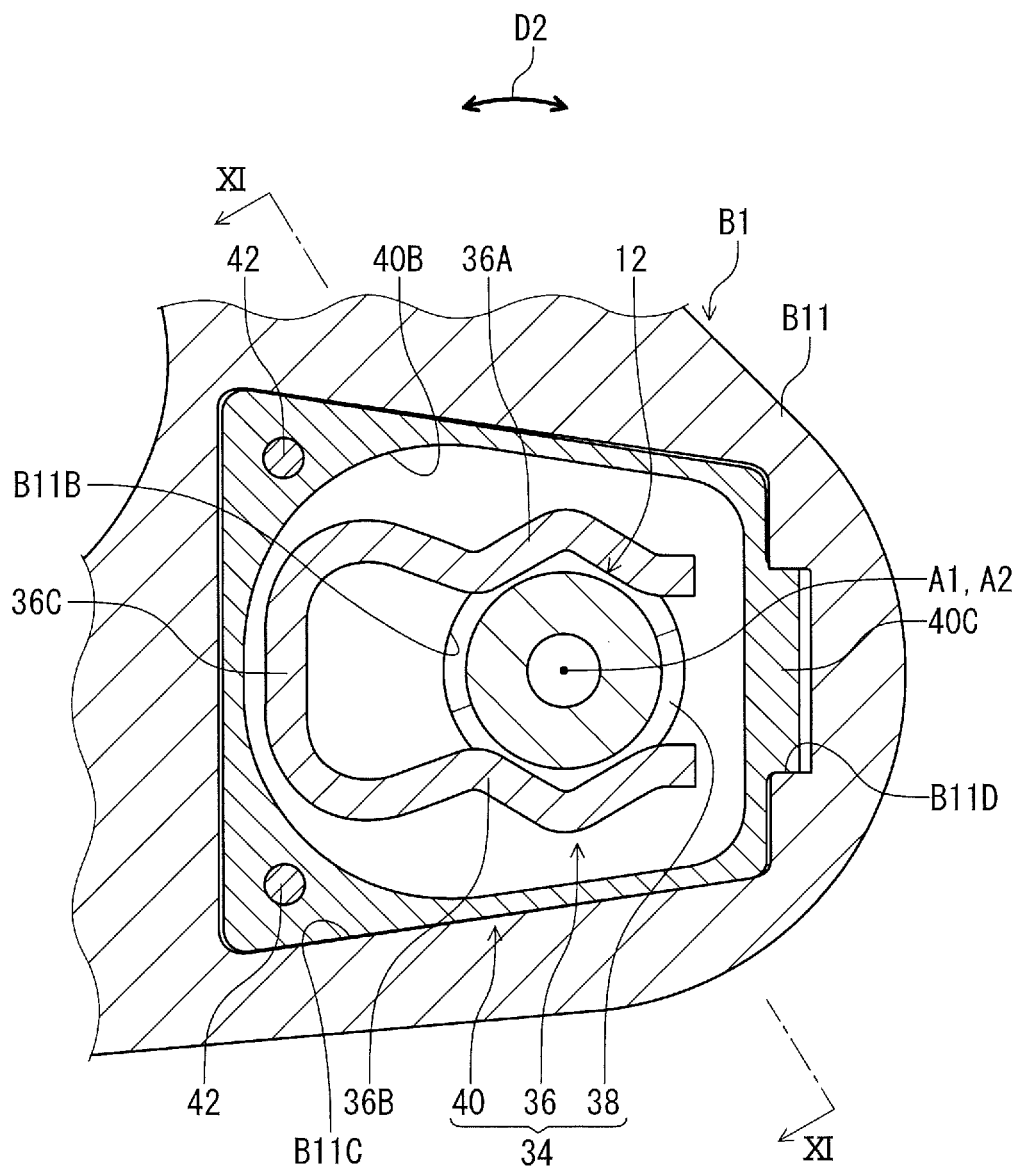
FIG. 13 is a cross-sectional view of the bicycle wheel securing device taken along line XIII-VIII of FIG. 11.

As seen in FIGS. 12 and 13, the cover 40 includes an accommodation recess 40B and an attachment protrusion 40C. The elastic retaining member 36 is provided in the accommodation recess 40B. The attachment protrusion 40C is provided in an attachment slot B11D (FIG. 13) of the first wheel attachment part B11 in a state where the cover 40 is attached to the first wheel attachment part B11.

As seen in FIG. 13, in this embodiment, the recess 38 extends in a circumferential direction D2 defined about the longitudinal center axis A2. Namely, the recess 38 includes an annular groove extending in the circumferential direction D2. However, the recess 38 can have a shape other than an annular shape.

The elastic retaining member 36 is elastically deformable in a direction perpendicular to the longitudinal center axis A2. In this embodiment, the elastic retaining member 36 includes a first portion 36A, a second portion 36B, and a third portion 36C. The first portion 36A is spaced apart from the second portion 36B and is provided on an opposite side of the second portion 36B with respect to the longitudinal center axis A2 of the shaft 12. The first portion 36A has a shape symmetrical to a shape of the second portion 36B. The third portion 36C couples the first portion 36A to the second portion 36B.

As seen in FIG. 5, the elastic retaining member 36 (e.g., the snap ring) is in slidable contact with an outer peripheral surface of the shaft 12 in the securing state where the bicycle-body engaging structure 16 is engaged with the second wheel attachment part B12 of the bicycle body B1. In this state, the bicycle wheel securing device 10 is movable along the longitudinal center axis A2 relative to the bicycle body B1 when the bicycle-body engaging structure 16 is disengaged from the second wheel attachment part B12.

As seen in FIG. 13, the elastic retaining member 36 (e.g., the snap ring) is engaged with the recess 38 in the maintenance state where the second shaft end 12B is positioned in the first wheel attachment part B11. The first portion 36A and the second portion 36B are fitted in the recess 38. The elastic retaining member 36 (the snap ring) applies a resistance force between the shaft 12 and the first wheel attachment part B11 to retain the second shaft end 12B in the first wheel attachment part B11. The bicycle wheel securing device 10 is movable along the longitudinal center axis A2 relative to the bicycle body B1 when an axial force which is greater than the resistance force is applied to the shaft 12.

As seen in FIG. 6, an axial distance L1 defined between the shaft-end retaining structure 34 and a shaft tip 12B1 of the second shaft end 12B in the axial direction D1 parallel to the longitudinal center axis A2 ranges from 5.0 mm to 35.0 mm. The axial distance L1 is equal to or smaller than 20.0 mm. In this embodiment, the axial distance L1 is defined between the shaft tip 12B1 and the recess 38 in the axial direction D1. However, the axial distance L1 is not limited to this embodiment. For example, the axial distance can range from approximately 5.0 mm to approximately 35.0 mm. The axial distance can be smaller than 5.0 mm or can be larger than 35.0 mm. The axial distance can be equal to or smaller than approximately 20.0 mm. The axial distance can be larger than 20.0 mm. Preferably, the axial distance L1 ranges from 5.0 mm to 35.0 mm in a case where the bicycle wheel securing device 10 is applied to a mountain bike. The axial distance L1 also preferably ranges from 5.0 mm to 20.0 mm in a case where the bicycle wheel securing device 10 is applied to a road bike.

With the bicycle wheel securing device 10, as seen in FIG. 3, the shaft-end retaining structure 34 is at least partly disposed at the second shaft end 12B to retain the second shaft end 12B in the first wheel attachment part B11 in the maintenance state where the second shaft end 12B is positioned in the first wheel attachment part B11 of the bicycle body B1. Thus, the shaft 12 can be retained by the shaft-end retaining structure 34 with respect to the first wheel attachment part B11 when the bicycle wheel B2 (FIG. 1) is detached from and attached to the bicycle body B1. Accordingly, it is possible to smoothly detach and attach the bicycle wheel B2 from and to the bicycle body B1.

Second Embodiment

A bicycle wheel securing device 210 in accordance with a second embodiment will be described below referring to FIGS. 14 to 17. The bicycle wheel securing device 210 has the same structure as that of the bicycle wheel securing device 10 except for the shaft-end retaining structure 34. Thus, elements having substantially the same function as those in the first embodiment will be numbered the same here, and will not be described and/or illustrated again in detail here for the sake of brevity.

Figure 14:
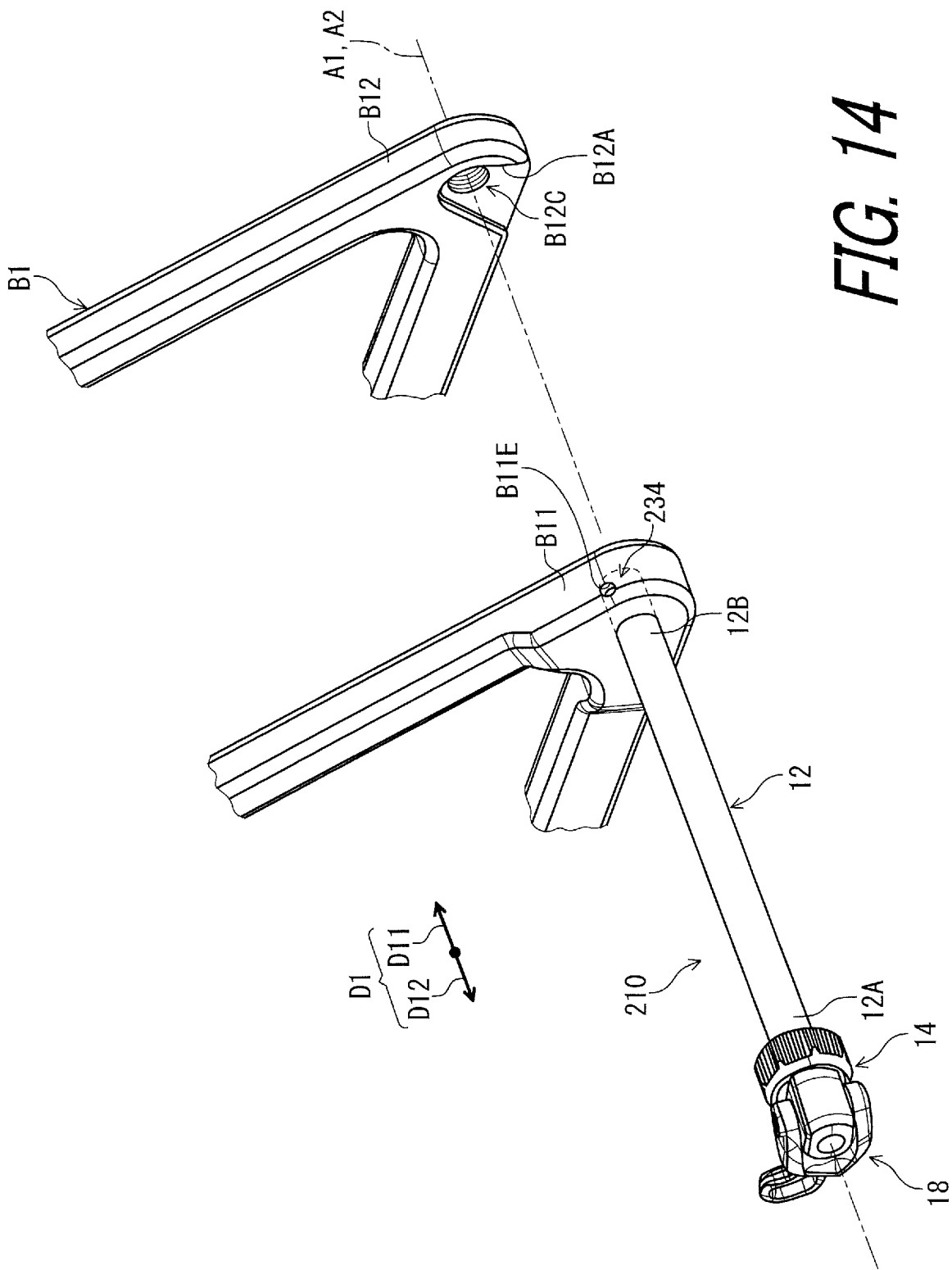
FIG. 14 is a perspective view of the bicycle body and a bicycle wheel securing device in accordance with a second embodiment (maintenance state).
Figure 15:
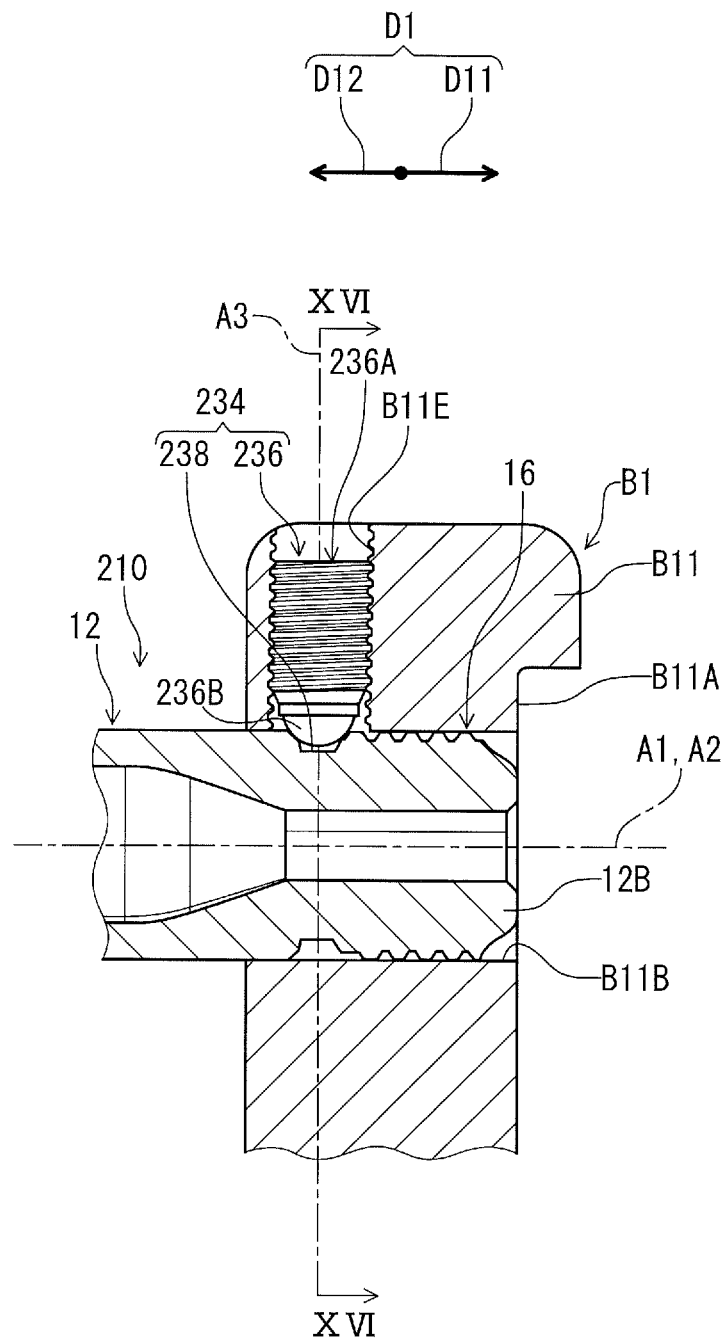
FIG. 15 is a cross-sectional view of the bicycle wheel securing device taken along line XV-XV of FIG. 16.
Figure 16:
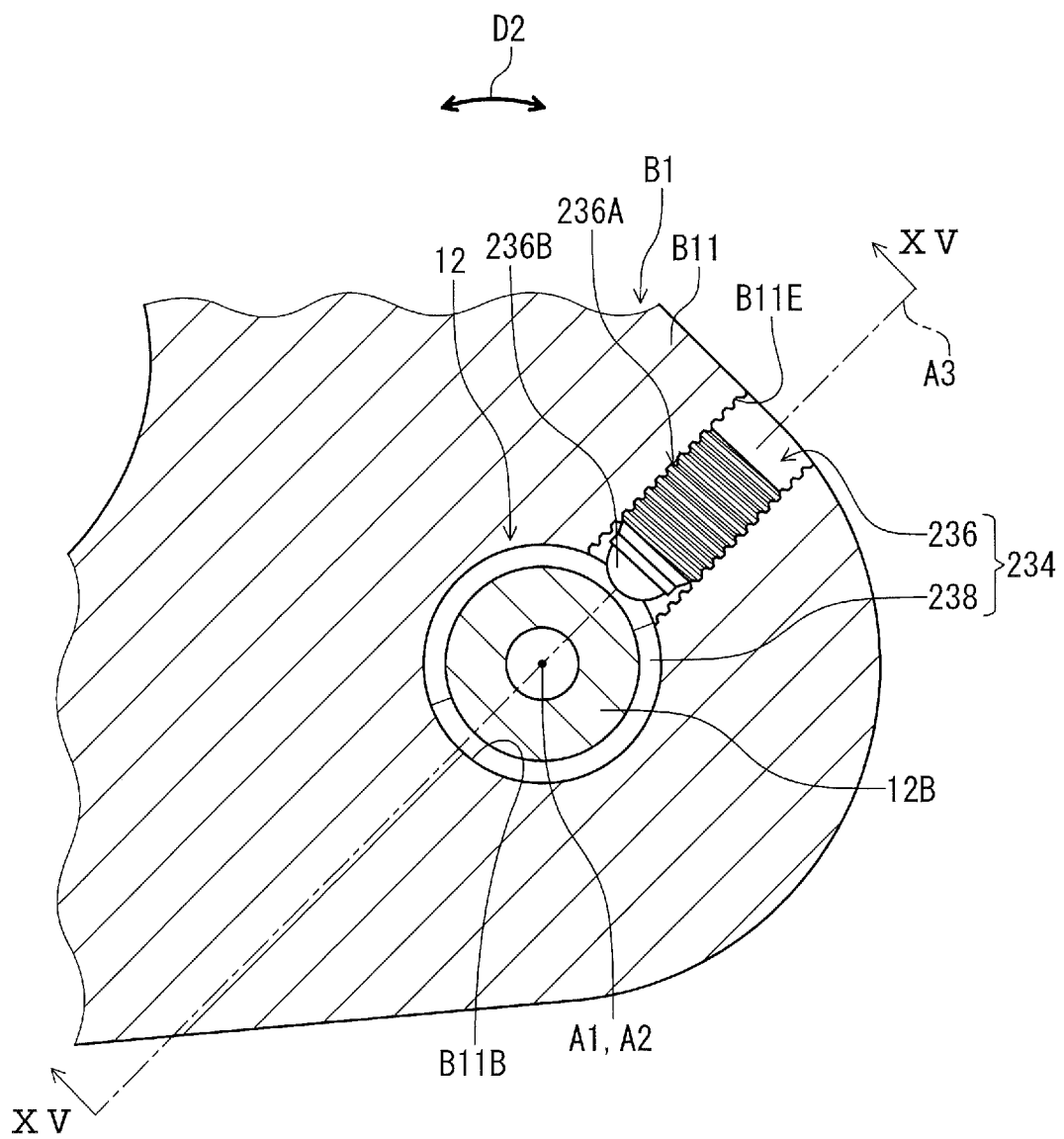
FIG. 16 is a cross-sectional view of the bicycle wheel securing device taken along line XVI-XVI of FIG. 15.

As seen in FIGS. 14 to 16, the bicycle wheel securing device 210 comprises the shaft 12, the axial abutment structure 14, the bicycle-body engaging structure 16, the manual actuator 18, and a shaft-end retaining structure 234. The bicycle wheel securing device 210 can be in each of the securing state (e.g., FIG. 2) and the maintenance state (e.g., FIG. 3) as well as the bicycle wheel securing device 10 of the first embodiment. The shaft-end retaining structure 234 is at least partly disposed at the second shaft end 12B to retain the second shaft end 12B in the first wheel attachment part B11 in a state (e.g., the maintenance state) where the second shaft end 12B is positioned in the first wheel attachment part B11 of the bicycle body B1.

As seen in FIGS. 15 and 16, the shaft-end retaining structure 234 includes a projection 236 and a recess 238. The projection 236 is attached to one of the first wheel attachment part B11 and the second shaft end 12B. The recess 238 is provided on the other of the first wheel attachment part B11 and the second shaft end 12B to receive the projection 236 in a state where the shaft-end retaining structure 234 retains the second shaft end 12B in the first wheel attachment part B11. In this embodiment, the projection 236 is attached to the first wheel attachment part B11, and the recess 238 is provided on the second shaft end 12B. However, the projection 236 can be attached to the second shaft end 12B, and the recess 238 can be provided on the first wheel attachment part B11.

In this embodiment, the projection 236 can also be referred to as a first retaining structure 236, and the recess 238 can also be referred to as a second retaining structure 238. Namely, the shaft-end retaining structure 234 comprises the first retaining structure 236 and the second retaining structure 238. The first retaining structure 236 is disposed at the first wheel attachment part B11 of the bicycle body B1. The second retaining structure 238 is at least partly disposed at the second shaft end 12B to be engaged with the first retaining structure 236 in the maintenance state where the second shaft end 12B is positioned in the first wheel attachment part B11 of the bicycle body B1.

In this embodiment, the projection 236 includes a plunger. The projection 236 is attached to the first wheel attachment part B11 by thread engagement. The first wheel attachment part B11 includes a threaded hole B11E to which internal threads are formed. External threads are formed on an outer surface of the projection 236. The projection 236 is screwed into the threaded-hole B11E. The threaded-hole B11E has a center axis A3 and extends along the center axis A3. In this embodiment, the center axis A3 of the threaded-hole B11E intersects with the longitudinal center axis A2 of the shaft 12. However, the arrangement of each of the projection 236 and the threaded-hole B11E is not limited to this embodiment.

As seen in FIG. 16, the recess 238 extends in the circumferential direction D2 defined about the longitudinal center axis A2. Namely, the recess 238 includes an annular groove extending in the circumferential direction D2. However, a shape of the recess 238 is not limited to this embodiment.

Figure 17:
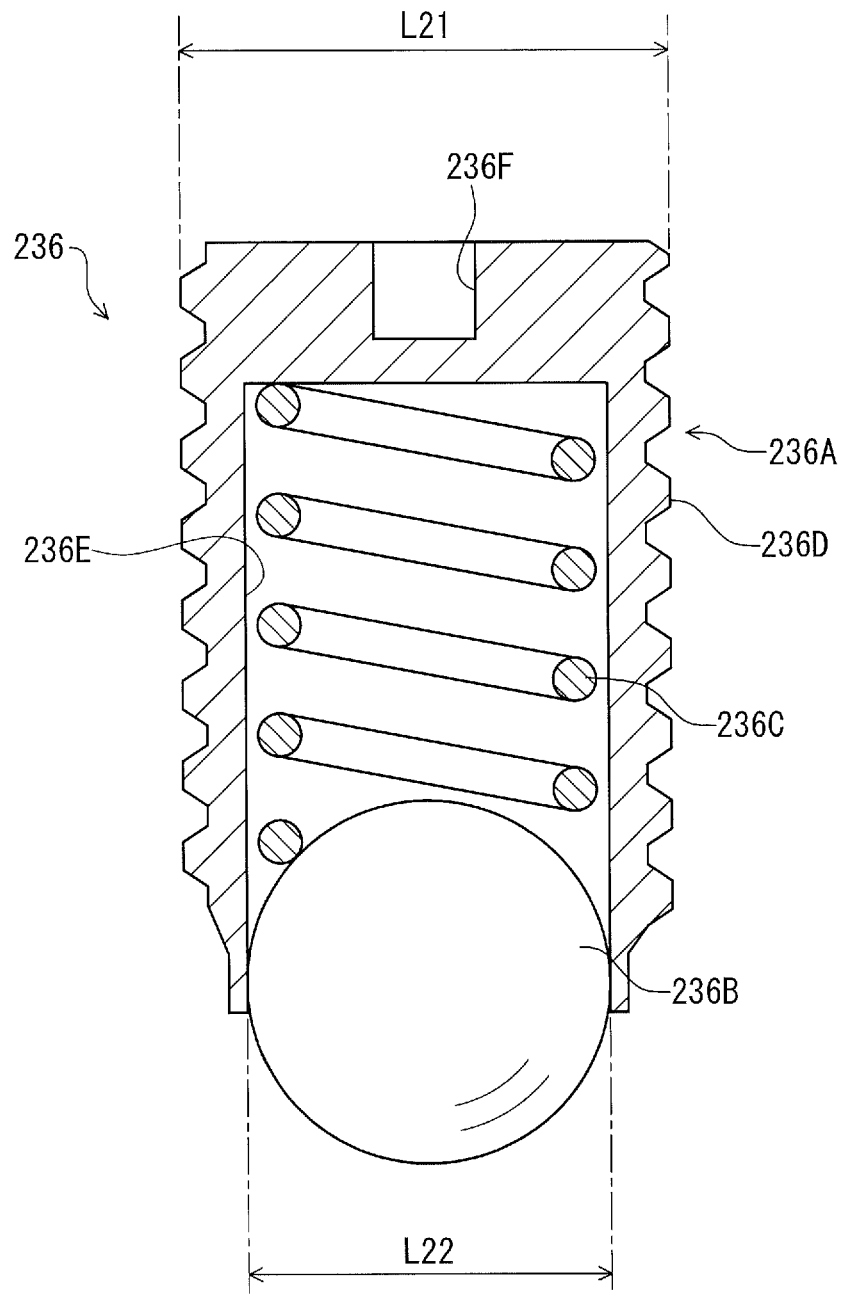
FIG. 17 is a cross-sectional view of a projection of the bicycle wheel securing device illustrated in FIG. 14.

As seen in FIG. 17, the projection 236 includes a main body 236A, a contact portion 236B, and a biasing member 236C. The main body 236A is threadedly engaged with the threaded-hole B11E (FIGS. 15 and 16). Specifically, the main body 236A includes an externally threaded part 236D threadedly engaged with the threaded-hole B11E. The contact portion 236B is movably provided at an end of the main body 236A. In this embodiment, the contact portion 236B includes a spherical body. The main body 236A includes a hole 236E. The contact portion 236B is movably provided in the hole 236E. The contact portion 236B is contactable with the second shaft end 12B (FIGS. 15 and 16). The biasing member 236C is provided in the hole 236E to bias the contact portion 236B against the shaft 12. The main body 236A includes a tool engagement part 236F with which a tool is to be engaged. The tool engagement part 236F includes a hexagon hole, for example. In this embodiment, an outer diameter L22 of the contact portion 236B is smaller than an outer diameter L21 of the main body 236A. The structure of the projection 236 is not limited to this embodiment.

As seen in FIG. 15, the projection 236 is rotated relative to the first wheel attachment part B11 by the user with the tool engaged with the tool engagement part 236F (FIG. 17). The rotation of the projection 236 moves the projection 236 in the threaded-hole B11E along the center axis A3. Thus, it is possible to adjust the position of the projection 236 relative to the shaft 12. A biasing force of the biasing member 236C keeps the contact portion 236B in contact with the shaft 12. The contact portion 236B is fitted in the recess 238 in the maintenance state where the second shaft end 12B is positioned in the first wheel attachment part B11 of the bicycle body B1. The projection 236 (the plunger) applies a resistance force between the shaft 12 and the first wheel attachment part B11 to retain the second shaft end 12B in the first wheel attachment part B11. The bicycle wheel securing device 210 is movable along the longitudinal center axis A2 relative to the bicycle body B1 when an axial force which is greater than the resistance force is applied to the shaft 12.

With the bicycle wheel securing device 210, it is possible to obtain substantially the same effect as that of the bicycle wheel securing device 10 of the first embodiment since the bicycle wheel securing device 210 comprises the shaft-end retaining structure 234.

Third Embodiment

A bicycle wheel securing device 310 in accordance with a third embodiment will be described below referring to FIGS. 18 to 22. The bicycle wheel securing device 310 has the same structure as that of the bicycle wheel securing device 10 except for the shaft-end retaining structure 34. Thus, elements having substantially the same function as those in the first embodiment will be numbered the same here, and will not be described and/or illustrated again in detail here for the sake of brevity.

Figure 18:
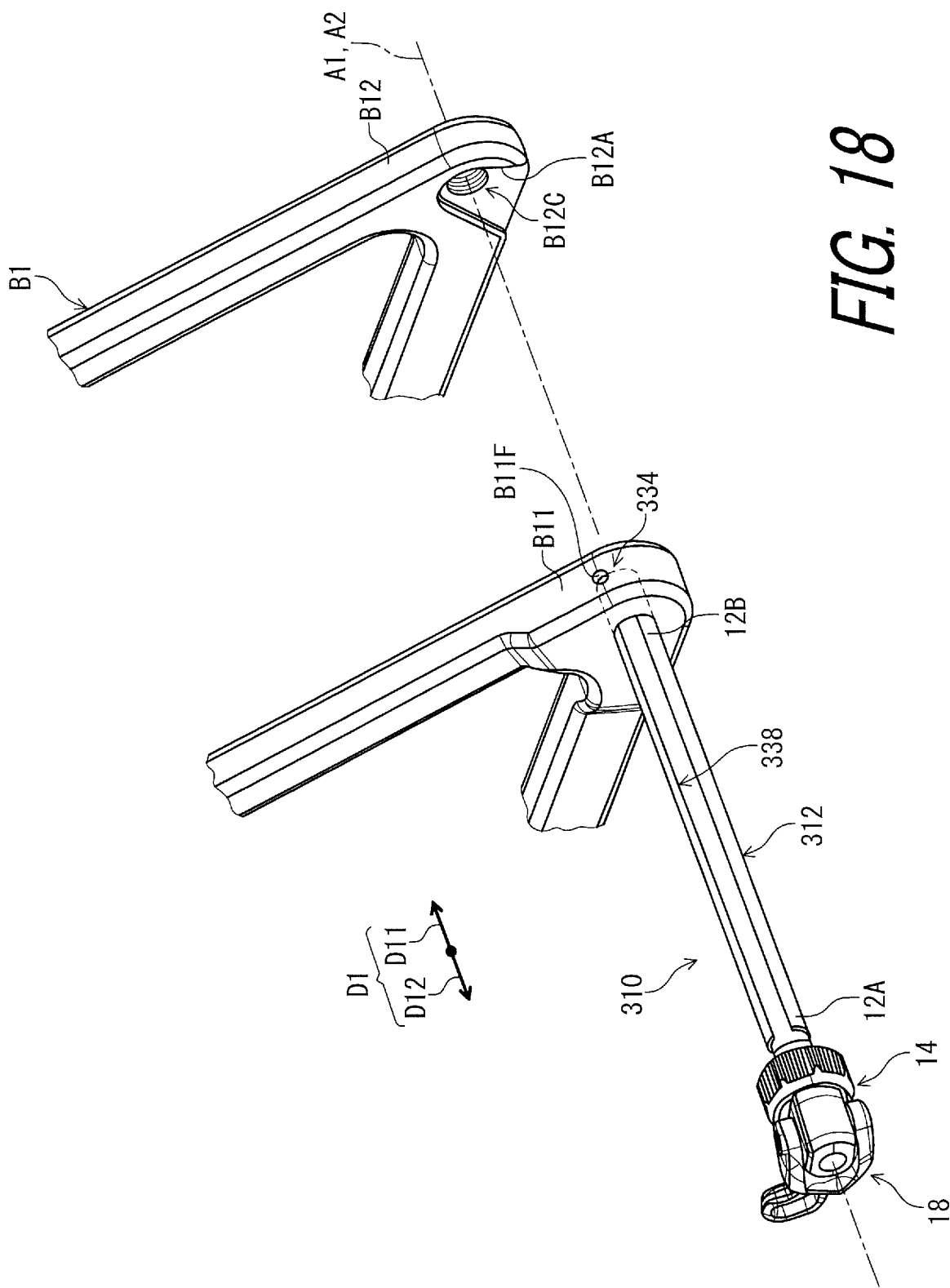
FIG. 18 is a perspective view of the bicycle body and a bicycle wheel securing device in accordance with a third embodiment (maintenance state).
Figure 19:
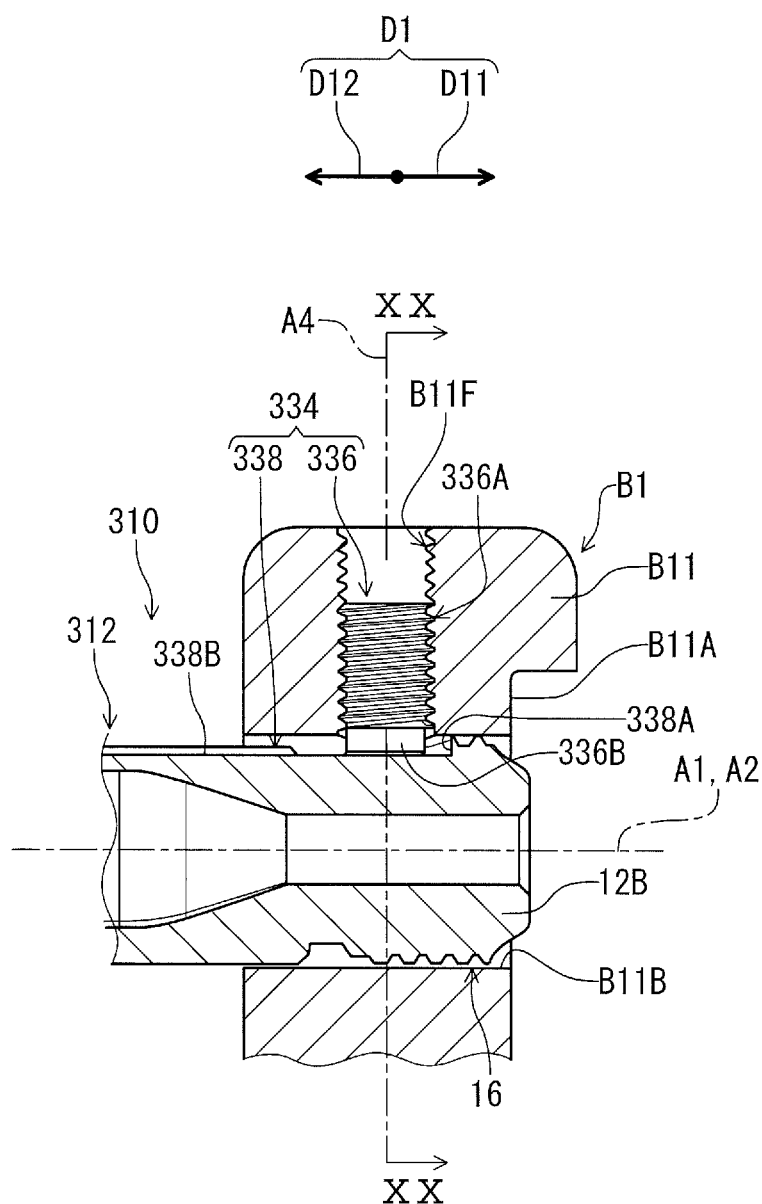
FIG. 19 is a cross-sectional view of the bicycle wheel securing device taken along line XIX-XIX of FIG. 20.
Figure 20:
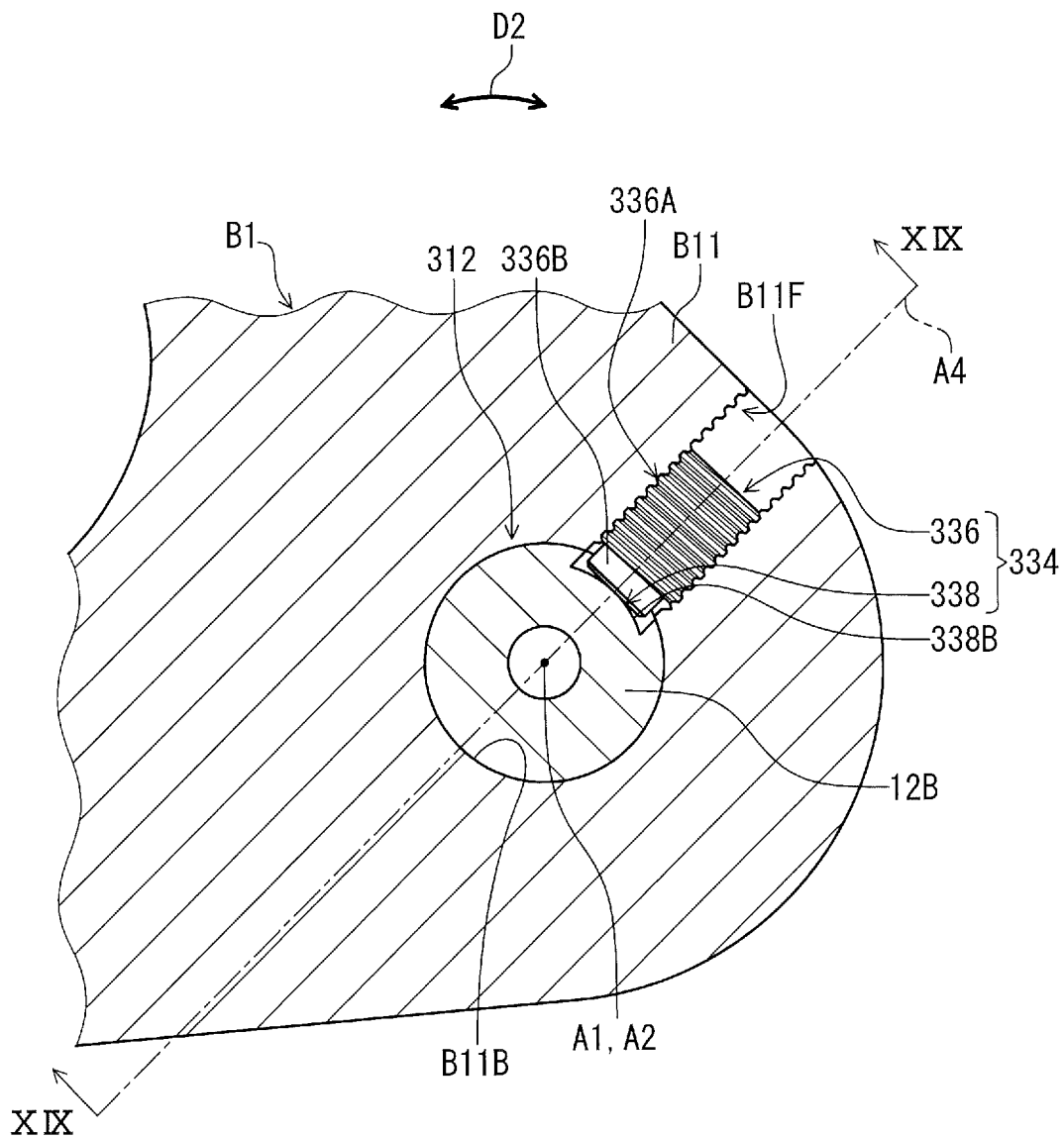
FIG. 20 is a cross-sectional view of the bicycle wheel securing device taken along line XX-XX of FIG. 19.

As seen in FIGS. 18 to 20, the bicycle wheel securing device 310 comprises a shaft 312, the axial abutment structure 14, the bicycle-body engaging structure 16, the manual actuator 18, and a shaft-end retaining structure 334. The bicycle wheel securing device 310 can be in each of the securing state (e.g., FIG. 2) and the maintenance state (e.g., FIG. 3) as well as the bicycle wheel securing device 10 of the first embodiment. The shaft 312 has the first shaft end 12A, the second shaft end 12B, and the longitudinal center axis A2. The shaft 312 extends between the first shaft end 12A and the second shaft end 12B along the longitudinal center axis A2. The shaft-end retaining structure 334 is at least partly disposed at the second shaft end 12B to retain the second shaft end 12B in the first wheel attachment part B11 in a state (e.g., the maintenance state) where the second shaft end 12B is positioned in the first wheel attachment part B11 of the bicycle body B1.

As seen in FIGS. 19 and 20, the shaft-end retaining structure 334 includes a projection 336 and a recess 338. The projection 336 is attached to one of the first wheel attachment part B11 and the second shaft end 12B. The recess 338 is provided on the other of the first wheel attachment part B11 and the second shaft end 12B to receive the projection 336 in a state where the shaft-end retaining structure 334 retains the second shaft end 12B in the first wheel attachment part B11. In this embodiment, the projection 336 is attached to the first wheel attachment part B11, and the recess 338 is provided on the second shaft end 12B.

In this embodiment, the projection 336 can also be referred to as a first retaining structure 336, and the recess 338 can also be referred to as a second retaining structure 338. Namely, the shaft-end retaining structure 334 comprises the first retaining structure 336 and the second retaining structure 338. The first retaining structure 336 is disposed at the first wheel attachment part B11 of the bicycle body B1. The second retaining structure 338 is at least partly disposed at the second shaft end 12B to be engaged with the first retaining structure 336 in the maintenance state where the second shaft end 12B is positioned in the first wheel attachment part B11 of the bicycle body B1.

In the illustrated embodiment, the projection 336 includes a set screw attached to the first wheel attachment part B11. The projection 336 is attached to the first wheel attachment part B11 by thread engagement. The first wheel attachment part B11 includes a threaded-hole B11F. The threaded-hole B11F has a center axis A4 and extends along the center axis A4. The main body 336A is movable in the threaded-hole B11F along the center axis A4. In this embodiment, the center axis A4 of the threaded-hole B11F intersects with the longitudinal center axis A2 of the shaft 312. However, the arrangement of each of the projection 336 and the threaded-hole B11F is not limited to this embodiment.

Figure 21:
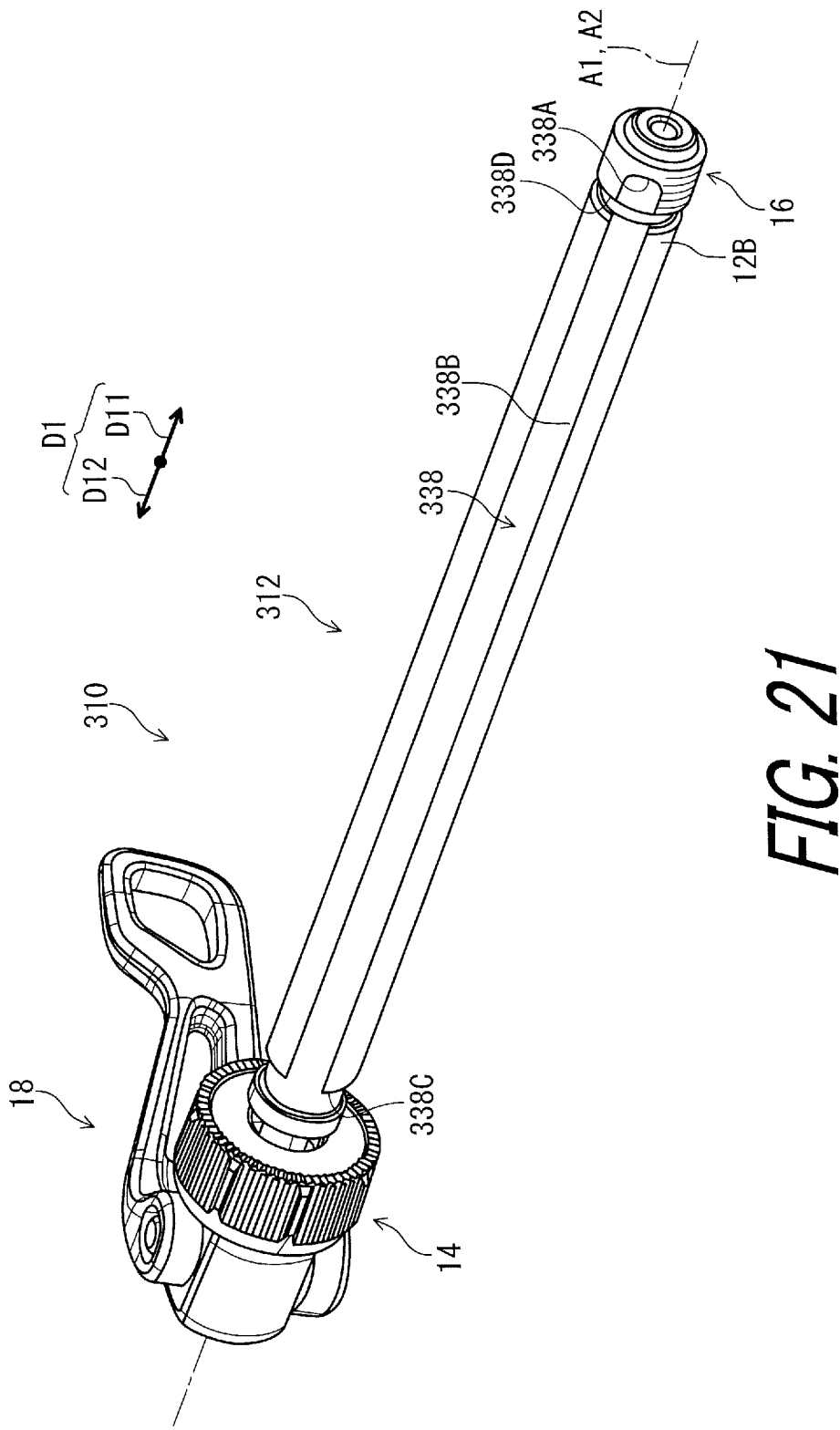
FIG. 21 is a perspective view of the bicycle wheel securing device illustrated in FIG. 18.

As seen in FIGS. 18 and 21, the recess 338 extends in the axial direction D1 parallel to the longitudinal center axis A2. The recess 338 is provided on the shaft 312 to extend in the axial direction D1 parallel to the longitudinal center axis A2. The recess 338 has a closed end 338A in the second shaft end 12B. Namely, the recess 338 includes a linear groove 338B extending in the axial direction D1. The projection 336 is contactable with the closed end 338A of the recess 338 in the axial direction D1.

As seen in FIG. 21, the recess 338 includes a first annular groove 338C and a second annular groove 338D. The first annular groove 338C is provided at the first shaft end 12A and is connected to the linear groove 338B. The second annular groove 338D is provided at the second shaft end 12B and is connected to the linear groove 338B. The projection 336 is slidably provided in the first annular groove 338C when the bicycle-body engaging structure 16 is engaged with and/or disengaged from the second wheel attachment part B12. The second annular groove 338D can be omitted from the recess 338.

Figure 22:
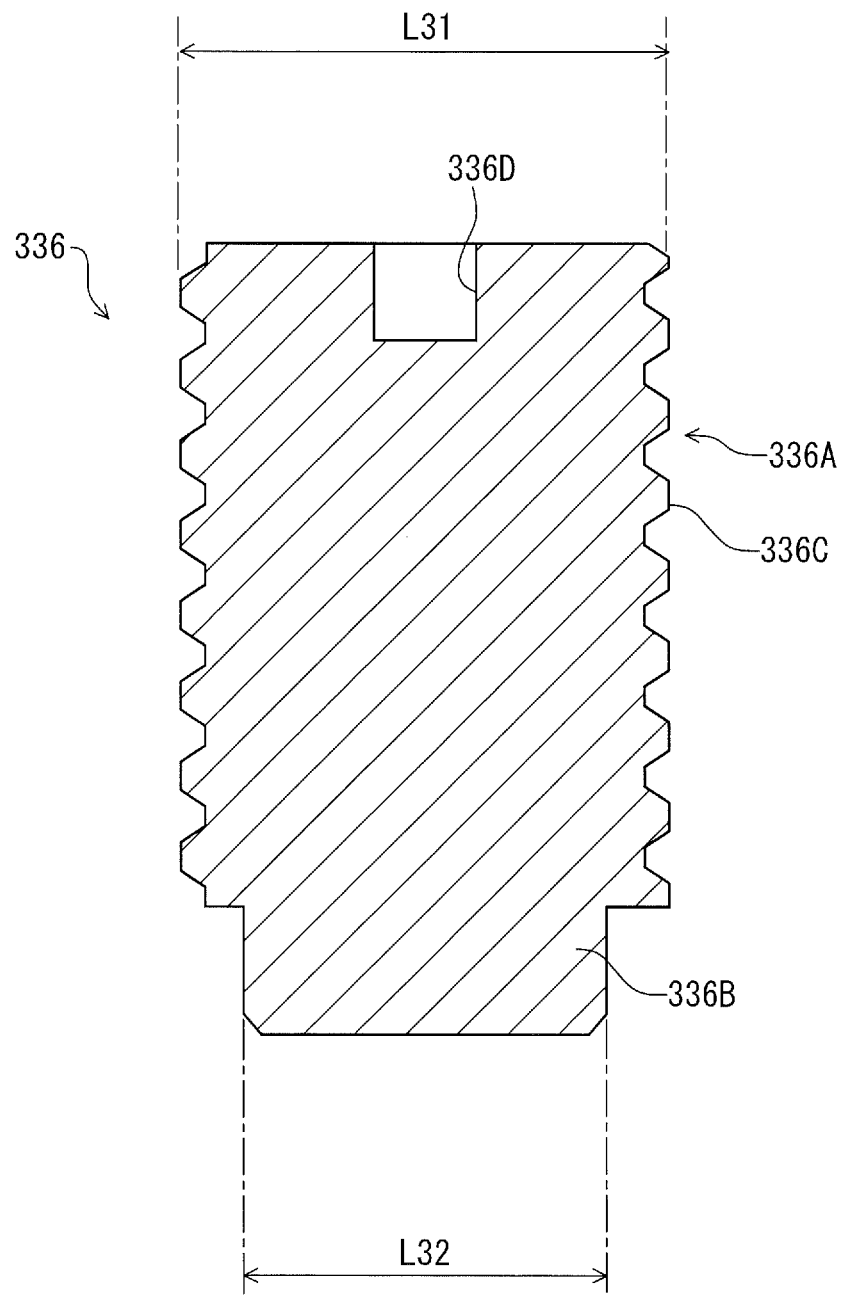
FIG. 22 is a cross-sectional view of a projection of the bicycle wheel securing device illustrated in FIG. 18.

As seen in FIG. 22, the projection 336 includes a main body 336A and a contact portion 336B. The main body 336A is threadedly engaged with the threaded-hole B11F (FIGS. 19 and 20). Specifically, the main body 336A includes an externally threaded part 336C threadedly engaged with the threaded-hole B11F. The contact portion 336B is provided at an end of the main body 336A and extends from the main body 336A. The contact portion 336B is slidably provided in the recess 338. The contact portion 336B is contactable with the second shaft end 12B. The main body 336A includes a tool engagement part 336D with which a tool is to be engaged. The tool engagement part 336D includes a hexagon hole, for example. In this embodiment, the contact portion 336B has a substantially columnar shape. An outer diameter L32 of the contact portion 336B is smaller than an outer diameter L31 of the main body 336A. The structure of the projection 336 is not limited to this embodiment.

As seen in FIG. 19, the projection 336 is rotated relative to the first wheel attachment part B11 by the user with the tool engaged with the tool engagement part 336D (FIG. 22). The rotation of the projection 336 moves the projection 336 in the threaded-hole B11F along the center axis A4. Thus, it is possible to adjust the position of the projection 336 relative to the shaft 312. The contact portion 336B is slidably provided in the recess 338 when a state of the bicycle wheel securing device 310 is changed between the securing state and the maintenance state. The projection 336 (the set screw) is contactable with the closed end 338A of the recess 338 to apply a resistance force between the shaft 312 and the first wheel attachment part B11 to retain the second shaft end 12B in the first wheel attachment part B11. The bicycle wheel securing device 310 is detached from and attached to the first wheel attachment part B11 when the projection 336 is rotated to move away from the recess 338.

With the bicycle wheel securing device 310, it is possible to obtain substantially the same effect as that of the bicycle wheel securing device 10 of the first embodiment since the bicycle wheel securing device 310 comprises the shaft-end retaining structure 334.

Fourth Embodiment

A bicycle wheel securing device 410 in accordance with a fourth embodiment will be described below referring to FIGS. 23 to 27. The bicycle wheel securing device 410 has the same structure as that of the bicycle wheel securing device 10 except for the shaft-end retaining structure 34. Thus, elements having substantially the same function as those in the first embodiment will be numbered the same here, and will not be described and/or illustrated again in detail here for the sake of brevity.

Figure 23:
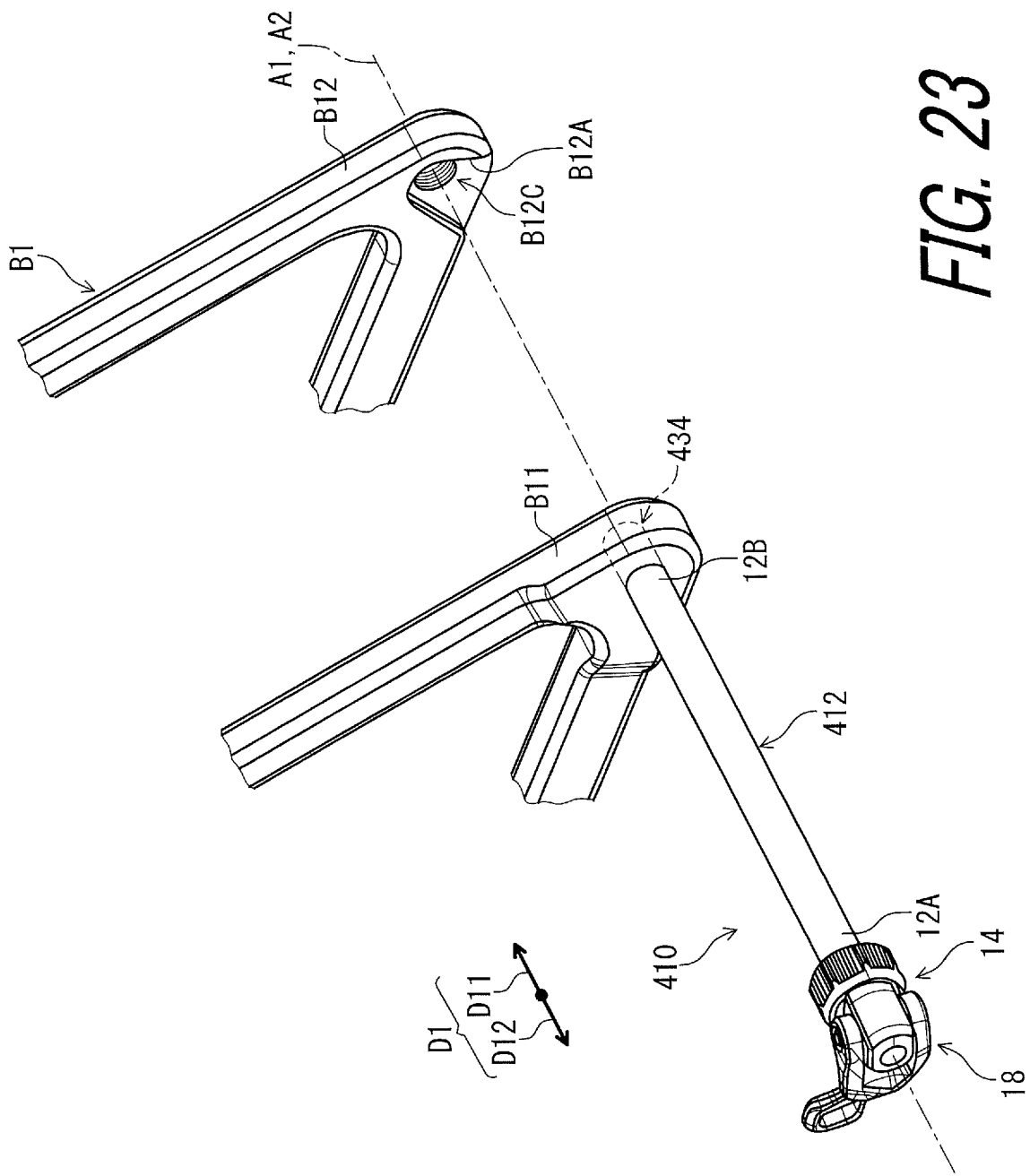
FIG. 23 is a perspective view of the bicycle body and a bicycle wheel securing device in accordance with a fourth embodiment (maintenance state).
Figure 24:
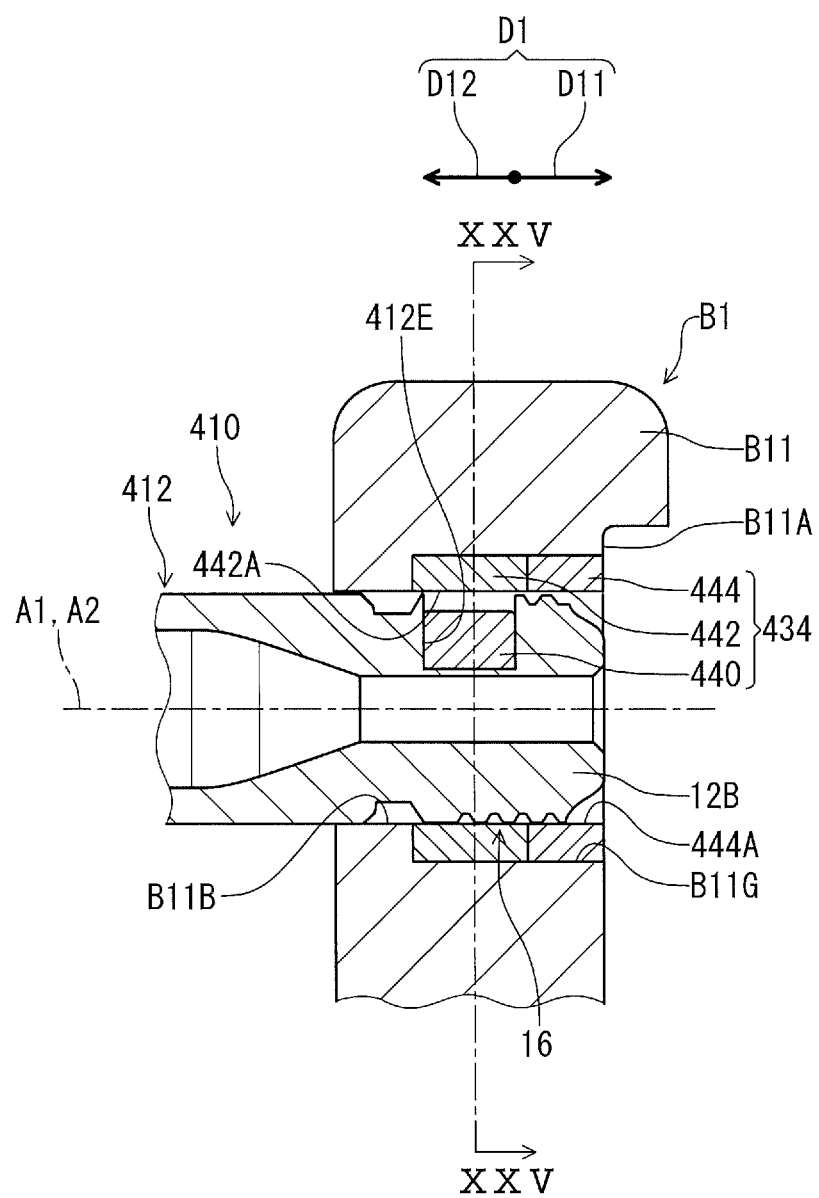
FIG. 24 is a cross-sectional view of the bicycle wheel securing device taken along line XXIV-XXIV of FIG. 25.
Figure 25:
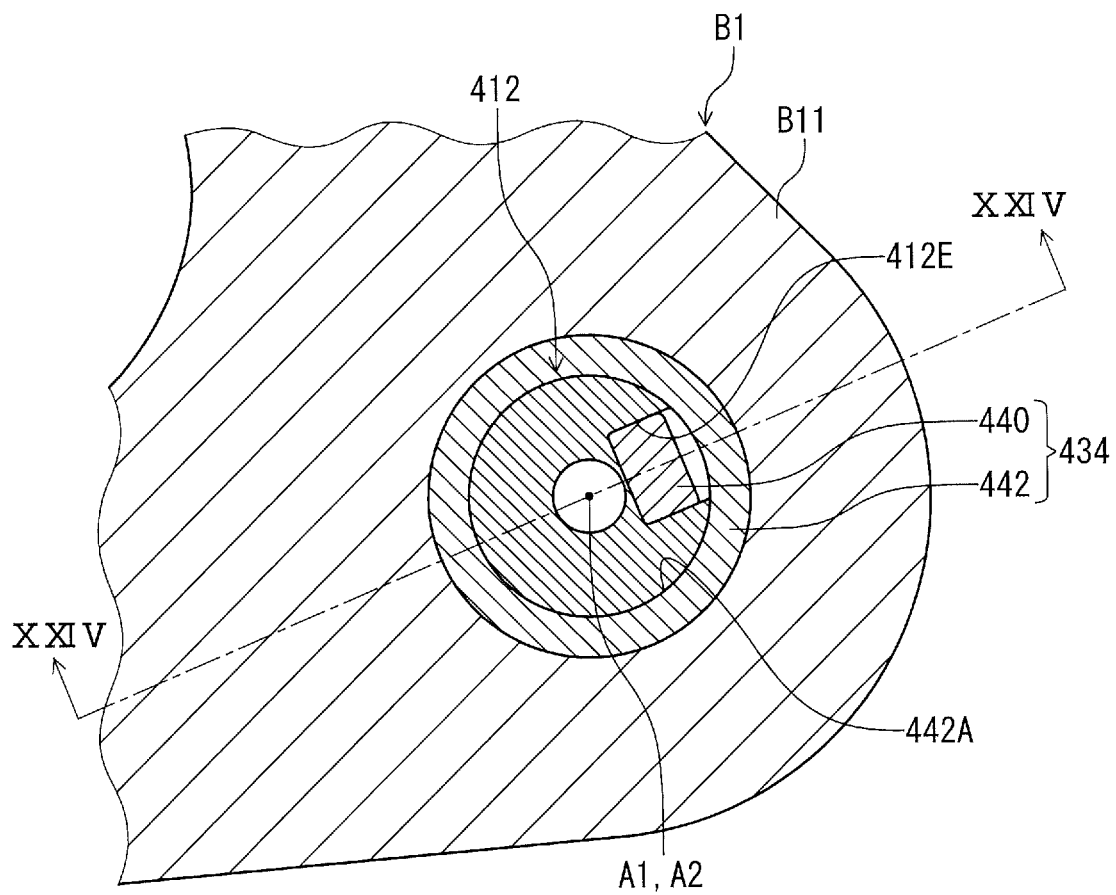
FIG. 25 is a cross-sectional view of the bicycle wheel securing device taken along line XXV-XXV of FIG. 24.

As seen in FIGS. 23 to 25, the bicycle wheel securing device 410 comprises a shaft 412, the axial abutment structure 14, the bicycle-body engaging structure 16, the manual actuator 18, and a shaft-end retaining structure 434. The bicycle wheel securing device 410 can be in each of the securing state (e.g., FIG. 2) and the maintenance state (e.g., FIG. 3) as well as the bicycle wheel securing device 10 of the first embodiment. The shaft 412 has the first shaft end 12A, the second shaft end 12B, and the longitudinal center axis A2. The shaft 412 extends between the first shaft end 12A and the second shaft end 12B along the longitudinal center axis A2. The shaft-end retaining structure 434 is at least partly disposed at the second shaft end 12B to retain the second shaft end 12B in the first wheel attachment part B11 in a state (e.g., the maintenance state) where the second shaft end 12B is positioned in the first wheel attachment part B11 of the bicycle body B1.

Figure 26:
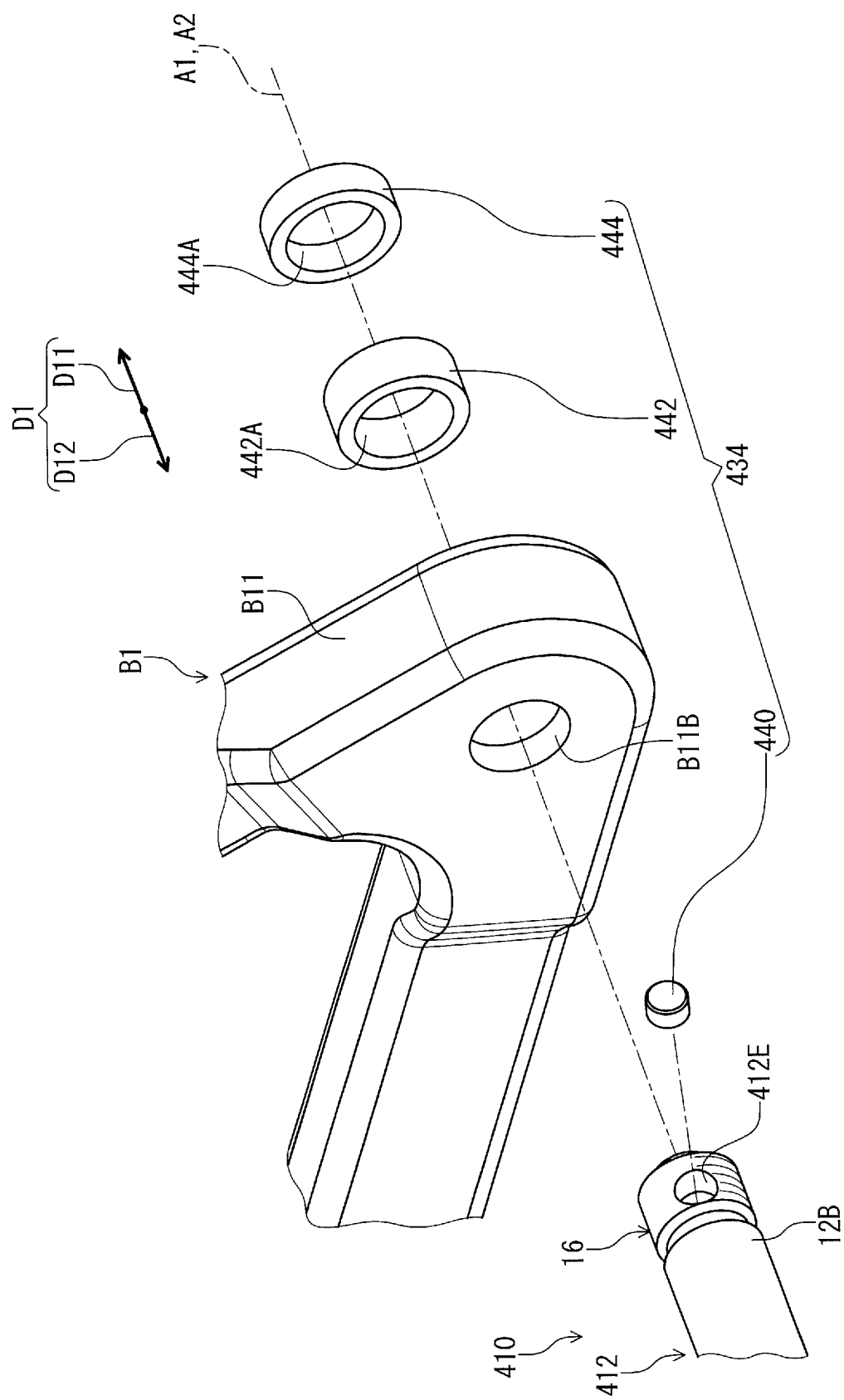
FIG. 26 is an exploded perspective view of the bicycle wheel securing device illustrated in FIG. 23.
Figure 27:
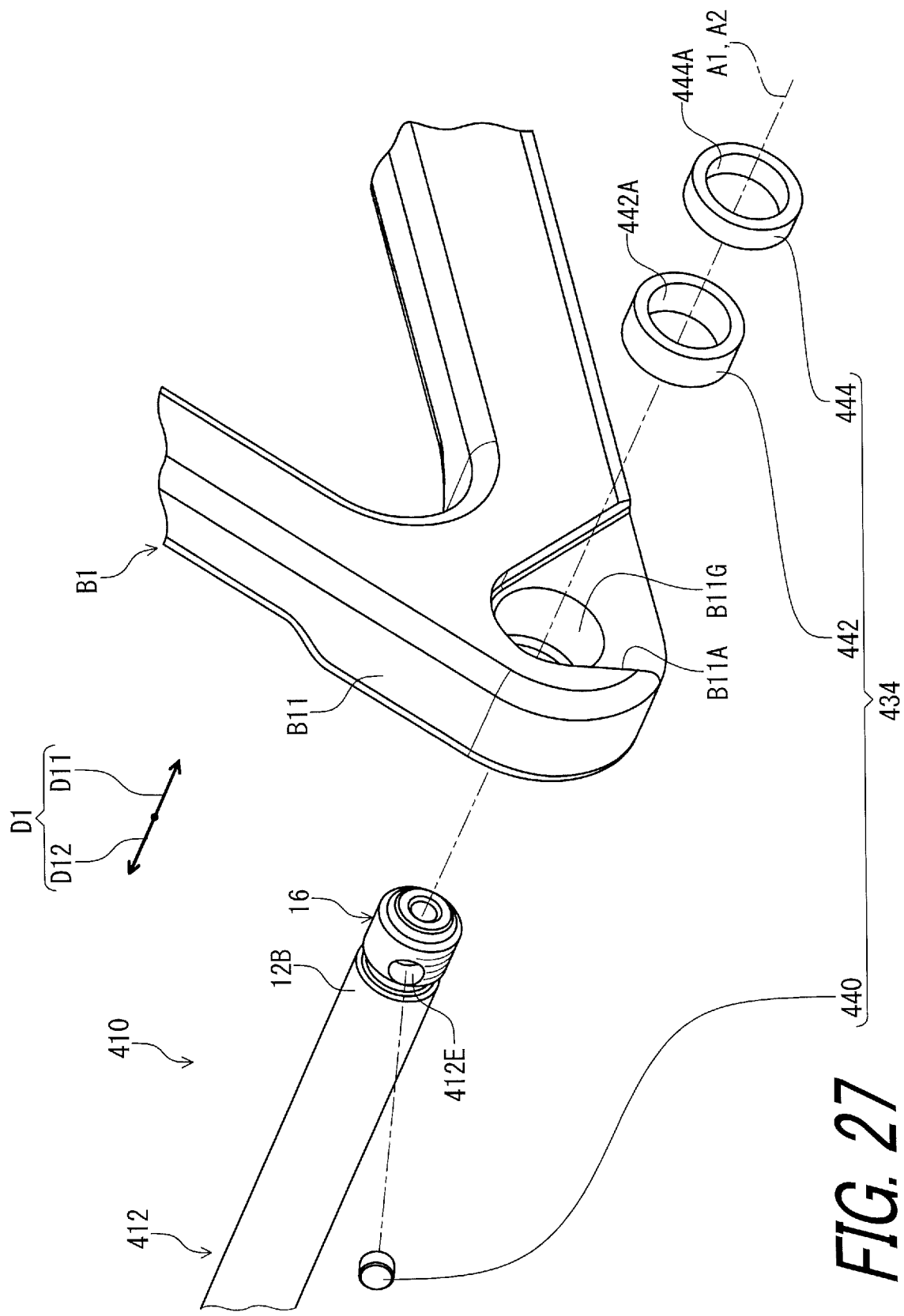
FIG. 27 is another exploded perspective view of the bicycle wheel securing device illustrated in FIG. 23.

As seen in FIGS. 26 and 27, the shaft-end retaining structure 434 includes a magnet 440 and a magnetic substance 442. The magnet 440 is attached to one of the first wheel attachment part B11 and the second shaft end 12B. The magnetic substance 442 is attached to the other of the first wheel attachment part B11 and the second shaft end 12B. In this embodiment, the magnet 440 is attached to the second shaft end 12B, and the magnetic substance 442 is attached to the first wheel attachment part B11. However, the magnet 440 can be attached to the first wheel attachment part B11, and the magnetic substance 442 can be attached to the second shaft end 12B.

In this embodiment, the magnetic substance 442 can also be referred to as a first retaining structure 442, and the magnet 440 can also be referred to as a second retaining structure 440. Namely, the shaft-end retaining structure 434 comprises the first retaining structure 442 and the second retaining structure 440. The first retaining structure 442 is disposed at the first wheel attachment part B11. The second retaining structure 440 is at least partly disposed at the second shaft end 12B to be retained with the first retaining structure 442 in the maintenance state where the second shaft end 12B is positioned in the first wheel attachment part B11 of the bicycle body B1.

As seen in FIGS. 24 and 25, in this embodiment, the shaft 412 includes an attachment recess 412E. The magnet 440 is provided in the attachment recess 412E. The magnet 440 is secured to the attachment recess 412E with adhesive, for example. The magnet 440 is a separate member from the second shaft end 12B. However, the magnet 440 can be integrally provided with the second shaft end 12B.

The magnetic substance 442 has an annular shape and includes an opening 442A. The first wheel attachment part B11 includes an attachment opening B11G. The shaft-end retaining structure 434 includes a securing member 444. The securing member 444 has an annular shape and includes an additional opening 444A. The magnetic substance 442 and the securing member 444 are provided in the attachment opening B11G and are secured to the first wheel attachment part B11 with the securing member 444. The securing member 444 is secured to the first wheel attachment part B11 with adhesive or in a press-fit manner, for example.

As seen in FIG. 24, an inner diameter of the attachment opening B11G is larger than an inner diameter of the first hole B11B. Preferably, an inner diameter of each of the magnetic substance 442 and the securing member 444 is substantially equal to the inner diameter of the first hole B11B.

The shaft 412 extends through the opening 442A and the additional opening 444A in each of the securing state and the maintenance state of the bicycle wheel securing device 410. A magnetic force is generated between the magnet 440 and the magnetic substance 442 in the maintenance state where the second shaft end 12B is positioned in the first wheel attachment part B11 of the bicycle body B1. The bicycle wheel securing device 410 is movable along the longitudinal center axis A2 relative to the bicycle body B1 when an axial force which is greater than the magnetic force is applied to the shaft 412.

With the bicycle wheel securing device 410, it is possible to obtain substantially the same effect as that of the bicycle wheel securing device 10 of the first embodiment since the bicycle wheel securing device 410 comprises the shaft-end retaining structure 434.

Fifth Embodiment

A bicycle wheel securing device 510 in accordance with a second embodiment will be described below referring to FIGS. 28 and 29. The bicycle wheel securing device 510 has the same structure as that of the bicycle wheel securing device 10 except for the shaft-end retaining structure 34. Thus, elements having substantially the same function as those in the first embodiment will be numbered the same here, and will not be described and/or illustrated again in detail here for the sake of brevity.

Figure 28:
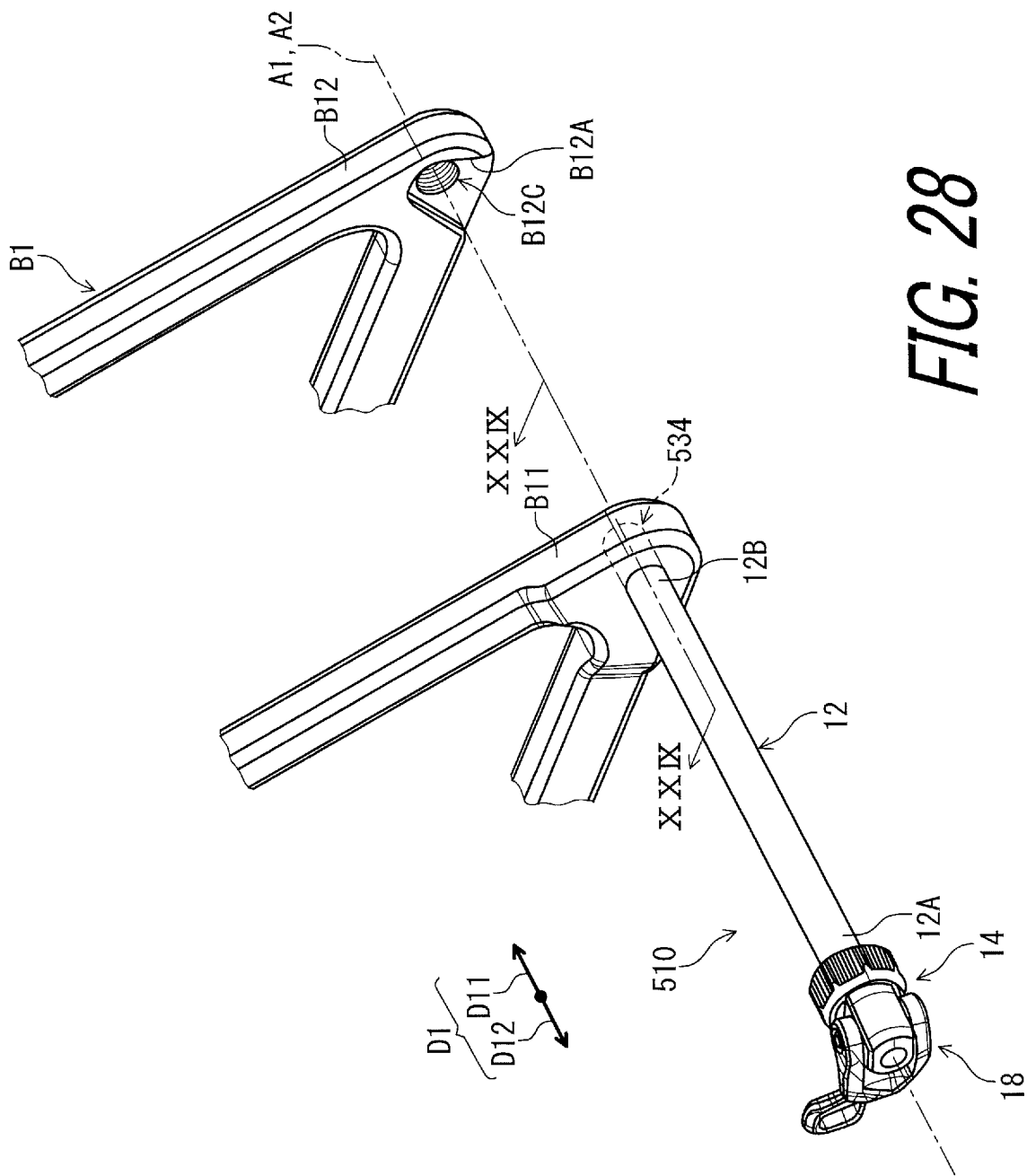
FIG. 28 is a perspective view of the bicycle body and a bicycle wheel securing device in accordance with a fifth embodiment (maintenance state).
Figure 29:
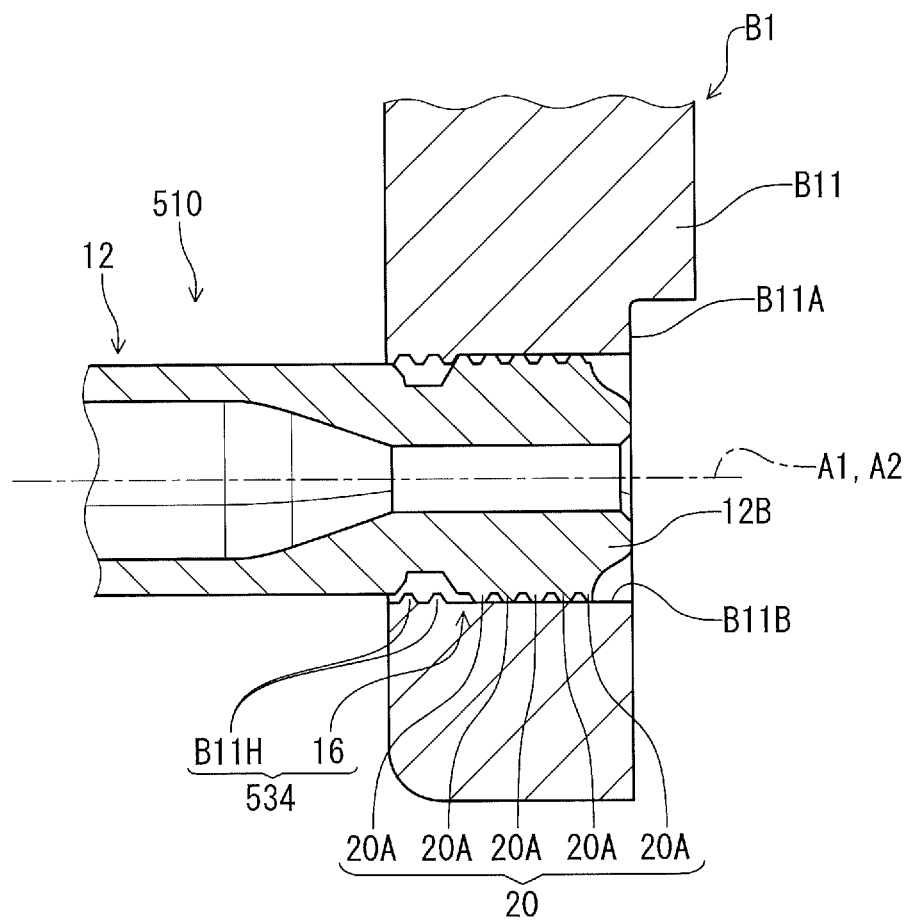
FIG. 29 is a cross-sectional view of the bicycle wheel securing device taken along line XXIX-XXIX of FIG. 28.

As seen in FIGS. 28 and 29, the bicycle wheel securing device 510 comprises the shaft 12, the axial abutment structure 14, the bicycle-body engaging structure 16, the manual actuator 18, and a shaft-end retaining structure 534. The bicycle wheel securing device 510 can be in each of the securing state (e.g., FIG. 2) and the maintenance state (e.g., FIG. 3) as well as the bicycle wheel securing device 10 of the first embodiment. The shaft-end retaining structure 534 is at least partly disposed at the second shaft end 12B to retain the second shaft end 12B in the first wheel attachment part B11 in a state (e.g., the maintenance state) where the second shaft end 12B is positioned in the first wheel attachment part B11 of the bicycle body B1.

As seen in FIG. 29, the shaft-end retaining structure 534 includes the bicycle-body engaging structure 16. Specifically, the shaft-end retaining structure 534 includes the male thread 20A. In this embodiment, the shaft-end retaining structure 534 includes the male threads 20A. The shaft-end retaining structure 534 includes a female thread B11H provided in the first hole B11B. The shaft-end retaining structure 534 includes the female threads B11H (e.g., two female threads B11H). However, the shaft-end retaining structure 534 can include at least one female thread B11H. A total number of the female threads B11H is less than a total number of the male threads 20A. However, the number of the female threads B11H can be equal to or greater than the total number of the male threads 20A. The female thread B11H restricts the second shaft end 12B from being unintentionally removed from the first wheel attachment part B11 in the maintenance state. This retains the second shaft end 12B in the first wheel attachment part B11 of the bicycle body B1.

With the bicycle wheel securing device 510, it is possible to obtain substantially the same effect as that of the bicycle wheel securing device 10 of the first embodiment since the bicycle wheel securing device 510 comprises the shaft-end retaining structure 534.

It will be apparent to those skilled in the bicycle field from the present disclosure that the above embodiments can be at least partly combined with each other if needed and/or desired. For example, it is possible to combine the shaft-end retaining structure 434 (a magnet and a magnetic substance) of the fourth embodiment with each of the shaft-end retaining structures 34, 234, 334, and 534 of the first to third and fifth embodiments.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle wheel securing device comprising:
a shaft having a first shaft end, a second shaft end, and a longitudinal center axis, the shaft extending between the first shaft end and the second shaft end along the longitudinal center axis;
an axial abutment structure disposed at the first shaft end;
a bicycle-body engaging structure disposed at the second shaft end;
a manual actuator operatively connected to the axial abutment structure to bias the axial abutment structure against a first wheel attachment part of a bicycle body in response to operation of the manual actuator in a securing state where the bicycle-body engaging structure is engaged with a second wheel attachment part of the bicycle body; and
a shaft-end retaining structure at least partly disposed at the second shaft end to retain the second shaft end in the first wheel attachment part in a maintenance state where the second shaft end is positioned in the first wheel attachment part of the bicycle body,
wherein the shaft-end retaining structure comprises a first retaining structure and a second retaining structure, the first retaining structure is disposed at the first wheel attachment part, and the second retaining structure is at least partly disposed at the second shaft end to be engaged with the first retaining structure in the maintenance state,
wherein a middle of the shaft has a first outermost diameter and the second retaining structure has a second outermost diameter, the second outermost diameter does not exceed the first outermost diameter, and
wherein the shaft-end retaining structure is configured to limit displacement of the shaft in an axial direction parallel to the longitudinal center axis in the maintenance state where the second shaft end is positioned in the first wheel attachment part of the bicycle body.

2. The bicycle wheel securing device according to claim 1, wherein
the shaft-end retaining structure includes an elastic retaining member.

3. A bicycle wheel securing device comprising:
a shaft having a first shaft end, a second shaft end, and a longitudinal center axis, the shaft extending between the first shaft end and the second shaft end along the longitudinal center axis;
an axial abutment structure disposed at the first shaft end;
a bicycle-body engaging structure disposed at the second shaft end;
a manual actuator operatively connected to the axial abutment structure to bias the axial abutment structure against a first wheel attachment part of a bicycle body in response to operation of the manual actuator in a securing state where the bicycle-body engaging structure is engaged with a second wheel attachment part of the bicycle body; and
a shaft-end retaining structure at least partly disposed at the second shaft end to retain the second shaft end in the first wheel attachment part in a maintenance state where the second shaft end is positioned in the first wheel attachment part of the bicycle body,
wherein the shaft-end retaining structure comprises a first retaining structure and a second retaining structure, the first retaining structure is disposed at the first wheel attachment part, and the second retaining structure is at least partly disposed at the second shaft end to be engaged with the first retaining structure in the maintenance state,
wherein a middle of the shaft has a first outermost diameter and the second retaining structure has a second outermost diameter, the second outermost diameter does not exceed the first outermost diameter,
wherein the shaft-end retaining structure includes an elastic retaining member, and
wherein the elastic retaining member comprises a snap ring.

4. The bicycle wheel securing device according to claim 2, wherein
the shaft-end retaining structure includes a recess provided on the second shaft end to receive the elastic retaining member in a state where the shaft-end retaining structure retains the second shaft end in the first wheel attachment part.

5. The bicycle wheel securing device according to claim 4, wherein
the recess extends in a circumferential direction defined about the longitudinal center axis.

6. The bicycle wheel securing device according to claim 1, wherein
the shaft-end retaining structure includes
a projection attached to one of the first wheel attachment part and the second shaft end, and
a recess provided on the other of the first wheel attachment part and the second shaft end to receive the projection in a state where the shaft-end retaining structure retains the second shaft end in the first wheel attachment part.

7. The bicycle wheel securing device according to claim 6, wherein
the projection includes a plunger.

8. The bicycle wheel securing device according to claim 6, wherein
the recess extends in a circumferential direction defined about the longitudinal center axis.

9. The bicycle wheel securing device according to claim 6, wherein
the recess extends in the axial direction parallel to the longitudinal center axis and has a closed end in the second shaft end.

10. The bicycle wheel securing device according to claim 6, wherein
the projection includes a set screw attached to the first wheel attachment part, and
the recess is provided on the shaft to extend in the axial direction parallel to the longitudinal center axis and has a closed end in the second shaft end.

11. The bicycle wheel securing device according to claim 1, wherein
the shaft-end retaining structure includes
a magnet attached to one of the first wheel attachment part and the second shaft end, and
a magnetic substance attached to the other of the first wheel attachment part and the second shaft end.

12. The bicycle wheel securing device according to claim 11, wherein
the magnet is attached to the second shaft end, and
the magnetic substance is attached to the first wheel attachment part.

13. The bicycle wheel securing device according to claim 12, wherein
the magnetic substance has an annular shape.

14. The bicycle wheel securing device according to claim 1, wherein
the manual actuator includes a lever pivotally mounted to the first shaft end, and
the manual actuator is operatively connected to the axial abutment structure to bias the axial abutment structure against the first wheel attachment part in response to a pivotal movement of the lever.

15. The bicycle wheel securing device according to claim 1, wherein
the shaft-end retaining structure includes the bicycle-body engaging structure.

16. The bicycle wheel securing device according to claim 1, wherein
the bicycle-body engaging structure includes a threaded portion provided on the second shaft end.

17. The bicycle wheel securing device according to claim 16, wherein
the threaded portion includes a male thread configured to be screwed in a female thread provided on the second wheel attachment part.

18. The bicycle wheel securing device according to claim 17, wherein
the shaft-end retaining structure includes the male thread.

19. The bicycle wheel securing device according to claim 1, wherein
an axial distance defined between the shaft-end retaining structure and a shaft tip of the second shaft end in the axial direction parallel to the longitudinal center axis ranges from 5.0 mm to 35.0 mm.

20. The bicycle wheel securing device according to claim 19, wherein
the axial distance ranges from 5.0 mm to 20.0 mm.

21. A bicycle wheel securing device comprising:
a shaft having a first shaft end, a second shaft end, and a longitudinal center axis, the shaft extending between the first shaft end and the second shaft end along the longitudinal center axis;
an axial abutment structure disposed at the first shaft end;
a bicycle-body engaging structure disposed at the second shaft end;
a manual actuator operatively connected to the axial abutment structure to bias the axial abutment structure against a first wheel attachment part of a bicycle body in response to operation of the manual actuator in a state where the bicycle-body engaging structure is engaged with a second wheel attachment part of the bicycle body; and
a shaft-end retaining structure comprising:
a first retaining structure disposed at the first wheel attachment part; and
a second retaining structure at least partly disposed at the second shaft end to be engaged with the first retaining structure in a maintenance state where the second shaft end is positioned in the first wheel attachment part of the bicycle body,
wherein a middle of the shaft has a first outermost diameter and the second retaining structure has a second outermost diameter, the second outermost diameter does not exceed the first outermost diameter, and
wherein the shaft-end retaining structure is configured to limit displacement of the shaft in an axial direction parallel to the longitudinal center axis in a state where the second shaft end is positioned in the first wheel attachment part.

22. The bicycle wheel securing device according to claim 21, wherein
an axial distance defined between the second retaining structure of the shaft-end retaining structure and a shaft tip of the second shaft end in the axial direction parallel to the longitudinal center axis ranges from 5.0 mm to 35.0 mm.

23. The bicycle wheel securing device according to claim 22, wherein
the axial distance ranges from 5.0 mm to 20.0 mm.

* * * * *